US011653387B2

United States Patent
Agiwal et al.

(10) Patent No.: US 11,653,387 B2
(45) Date of Patent: May 16, 2023

(54) RANDOM ACCESS METHOD AND APPARATUS IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 16/588,001

(22) Filed: Sep. 30, 2019

(65) Prior Publication Data

US 2020/0107372 A1 Apr. 2, 2020

Related U.S. Application Data

(60) Provisional application No. 62/738,374, filed on Sep. 28, 2018.

(51) Int. Cl.
*H04W 74/08* (2009.01)
*H04W 80/02* (2009.01)
(Continued)

(52) U.S. Cl.
CPC ....... *H04W 74/0833* (2013.01); *H04W 24/08* (2013.01); *H04W 72/042* (2013.01);
(Continued)

(58) Field of Classification Search
None
See application file for complete search history.

(56) References Cited

U.S. PATENT DOCUMENTS 10,455,456 B2 10/2019 Jang et al.
2018/0103465 A1 4/2018 Agiwal et al.
(Continued)

FOREIGN PATENT DOCUMENTS

IN 201711020022 3/2019
KR 10-2018-0090658 A 8/2018
(Continued)

OTHER PUBLICATIONS

International Search Report dated Jan. 15, 2020, issued in an International Application No. PCT/KR2019/012735.
(Continued)

*Primary Examiner* — Basil Ma
(74) *Attorney, Agent, or Firm* — Jefferson IP Law, LLP

(57) ABSTRACT

A random access method in a wireless communication system and an apparatus therefor are provided. A method for performing two-step random access in user equipment (UE) includes transmitting a first message to a base station (BS), the first message including a medium access control (MAC) packet data unit (PDU) that includes a common control channel (CCCH) service data unit (SDU) or a cell radio network temporary identifier (C-RNTI), and a random access preamble, monitoring a physical downlink control channel (PDCCH) for a second message from the BS within a configured time window, the second message corresponding to the first message, and determining whether the two-step random access is successful based on a result of the monitoring.

15 Claims, 32 Drawing Sheets

(51) Int. Cl.
*H04W 72/14* (2009.01)
*H04W 24/08* (2009.01)
*H04W 72/04* (2009.01)
*H04W 76/11* (2018.01)

(52) U.S. Cl.
CPC ............ *H04W 72/14* (2013.01); *H04W 76/11* (2018.02); *H04W 80/02* (2013.01)

(56) References Cited

U.S. PATENT DOCUMENTS

| | | | |
|---|---|---|---|
| 2018/0270869 A1* | 9/2018 | Tsai | H04W 76/27 |
| 2019/0350004 A1* | 11/2019 | Zhao | H04W 74/0833 |
| 2020/0100299 A1* | 3/2020 | Loehr | H04W 76/11 |
| 2021/0219349 A1* | 7/2021 | Huang | H04W 74/0833 |

FOREIGN PATENT DOCUMENTS

| | | |
|---|---|---|
| WO | 2018-075256 A1 | 4/2018 |
| WO | 2018/127244 A1 | 7/2018 |

OTHER PUBLICATIONS

MediaTek Inc.; 3GPP TSG-RAN WG2 Meeting #103bis; Further considerations on 2-step RACH; R2-1813965; Oct. 27, 2018, Chengdu, China.

Samsung; 3GPP TSG RAN WG1 Meeting #94; Initial Access and Mobility Procedure for NR-U; R1-1808769; Aug. 11, 2018, Gothenburg, Sweden.

ZTE Corporation, Sanechips; 3GPP TSG-RAN WG2 Meeting#103-bis; Msg2 payload contents for 2-step RACH; R2-1814034; Sep. 27, 2018, Chengdu, China.

Extended European Search Report dated Oct. 27, 2021, issued in European Patent Application No. 19864062.5.

* cited by examiner

RANDOM ACCESS METHOD AND APPARATUS IN WIRELESS COMMUNICATION SYSTEM

CROSS-REFERENCE TO RELATED APPLICATION(S)

This application is based on and claims priority under 35 U.S.C. § 119(e) of a U.S. Provisional application No. 62/738,374, filed on Sep. 28, 2018, in the United States Patent and Trademark Office, the disclosure of which is incorporated by reference herein in its entirety.

BACKGROUND

1. Field

The disclosure relates to a method and apparatus for random access in a wireless communication system.

2. Description of Related Art

To meet the soaring demand with respect to wireless data traffic because the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as a beyond-4G-network communication systems or a post-long term evolution (LTE) systems. The 5G communication system prescribed in the $3^{rd}$ Generation Partnership Project (3GPP) is called a new radio (NR) system. For higher data transmission rates, the implementation of 5G communication systems on ultra-high frequency bands millimeter wave (mmWave), e.g., 60 GHz, is being considered. In 5G communication systems, beamforming, massive multi-input multi-output (MIMO), full dimensional MIMO (FD-MIMO), an array antenna, analog beamforming, and large-scale antenna technologies have been discussed as ways of alleviating propagation path loss and increasing propagation distances in ultra-high frequency bands, and have also been applied to NR systems. For system network improvement, in 5G communication systems, technologies such as evolved small cell, advanced small cell, cloud Radio Access Network (RAN), ultra-dense network, Device to Device (D2D) communication, wireless backhaul, moving network, cooperative communication, Coordinated Multi-Points (CoMPs), and interference cancellation have been developed. In a 5G system, Advanced Coding Modulation (ACM) schemes including hybrid Frequency-Shift Keying (FSK) and Quadrature Amplitude Modulation (QAM) Modulation (FQAM) and Sliding Window Superposition Coding (SWSC), and advanced access schemes including Filter Bank Multi Carrier (FBMC), Non-Orthogonal Multiple Access (NOMA), and Sparse Code Multiple Access (SCMA) have been developed.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. In order to implement IoT, technological elements, such as sensing technology, wired/wireless communication and network infrastructure, service interface technology, and security technology, are required, and in this regard, technologies such as sensor networks, machine to machine (M2M), machine-type communication (MTC), and so forth have recently been researched for connection between things. Such an IoT environment may provide intelligent Internet technology (IT) services that create new value to human life by collecting and analyzing data generated among connected things. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication, such as sensor networks, M2M, MTC, etc., has been implemented by a scheme such as beamforming, MIMO, an array antenna, and so forth. The application of cloud RAN as a Big Data processing technology may also be an example of the convergence of 5G technology and IoT technology.

As described above, various services may be provided as mobile communication systems develop, and accordingly, a random access procedure for providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for effectively providing a service in a wireless communication system.

Additional aspects will be set forth in part in the description which follows and, in part, will be apparent from the description, or may be learned by practice of the presented embodiments of the disclosure.

In accordance with an aspect of the disclosure, a method for performing two-step random access in user equipment (UE) is provided. The method includes transmitting a first message to a base station (BS), the first message including a medium access control (MAC) packet data unit (PDU) that includes a common control channel (CCCH) service data unit (SDU) or a cell radio network temporary identifier (C-RNTI), and a random access preamble, monitoring a physical downlink control channel (PDCCH) for a second message from the BS within a configured time window, the second message corresponding to the first message, and determining whether the two-step random access is successful based on a result of the monitoring.

In an embodiment of the disclosure, the transmitting of the first message may include transmitting the first message including the MAC PDU that includes the CCCH SDU, and the monitoring may include monitoring a PDCCH addressed to a random access RNTI (RA-RNTI).

In an embodiment of the disclosure, the determining of whether the two-step random access is successful based on the result of the monitoring may include receiving the second message from the BS based on the PDCCH addressed to the random access RNTI (RA-RNTI), and based on a MAC PDU of the second message including contention resolution identity (ID) that matches first X bits of the CCCH SDU, determining that the two-step random access is successful.

In an embodiment of the disclosure, the X may be 48.

In an embodiment of the disclosure, the MAC PDU of the second message may include at least one downlink (DL) SDU for at least one logic channel.

In an embodiment of the disclosure, the transmitting of the first message may include transmitting the first message including the MAC PDU that includes the C-RNTI, and the monitoring may include monitoring a PDCCH addressed to an RA-RNTI and a PDCCH addressed to the C-RNTI.

In an embodiment of the disclosure, the determining of whether the two-step random access is successful based on the result of the monitoring may include determining that the two-step random access is successful based on receiving the PDCCH addressed to the C-RNTI from the BS.

In an embodiment of the disclosure, the determining of whether the two-step random access is successful based on the result of the monitoring may include receiving the PDCCH addressed to the C-RNTI from the BS, and determining that the two-step random access is successful based on the PDCCH addressed to the C-RNTI including UL grant.

In an embodiment of the disclosure, the determining of whether the two-step random access is successful based on the result of the monitoring may include receiving the second message from the BS based on the PDCCH for the second message, and determining that fallback to a four-step contention-based random access procedure is indicated based on a MAC PDU of the second message including a random access preamble identifier (RAPID) matching the random access preamble.

In an embodiment of the disclosure, the method may further include performing a four-step contention-based random access procedure.

In an embodiment of the disclosure, the second message may further include UL grant, and the performing of the four-step contention-based random access procedure may include transmitting a third message of the four-step contention-based random access procedure to the BS based on the UL grant.

In an embodiment of the disclosure, the time window may start after a set offset after the first message is transmitted, and the offset may have a value equal to or greater than zero.

In accordance with another aspect of the disclosure, a method for performing two-step random access in a base station (BS) is provided. The method includes receiving a first message from user equipment (UE), the first message including at least one of a medium access control (MAC) packet data unit (PDU) that includes a common control channel (CCCH) service data unit (SDU) or a cell radio network temporary identifier (C-RNTI), or a random access preamble, transmitting a physical downlink control channel (PDCCH) for a second message corresponding to the first message to the UE within a configured time window, and transmitting the second message based on a PDCCH for the first and second messages to the UE within the configured time window.

In an embodiment of the disclosure, the first message may include the MAC PDU including the CCCH SDU, the transmitting of the PDCCH for the second message may include transmitting a PDCCH addressed to a random access RNTI (RA-RNTI), and the second message may include a MAC PDU including a contention resolution identity (ID) that matches first X bits of the CCCH SDU.

In an embodiment of the disclosure, the MAC PDU of the second message may include at least one downlink (DL) SDU for at least one logic channel.

In an embodiment of the disclosure, the first message may include the MAC PDU including the C-RNTI, and the transmitting of the PDCCH for the second message may include transmitting a PDCCH addressed to an RA-RNTI and a PDCCH addressed to the C-RNTI.

In an embodiment of the disclosure, the PDCCH for the second message may include uplink (UL) grant.

In an embodiment of the disclosure, the first message may include the random access preamble, and the second message may include a MAC PDU including a random access preamble identifier (RAPID) that matches the random access preamble.

In accordance with another aspect of the disclosure, a user equipment (UE) for performing two-step random access is provided. The UE includes a transceiver, at least one memory storing a program to perform the two-step random access, and at least one processor configured to execute the program to transmit a first message to a base station (BS), the first message including a medium access control (MAC) packet data unit (PDU) that includes a common control channel (CCCH) service data unit (SDU) or a cell radio network temporary identifier (C-RNTI), and a random access preamble, monitor a physical downlink control channel (PDCCH) for a second message from the BS within a configured time window, the second message corresponding to the first message, and determine whether the two-step random access is successful based on a result of the monitoring.

In accordance with another aspect of the disclosure, a base station (BS) for performing two-step random access is provided. The base station includes a transceiver, at least one memory storing a program to perform the two-step random access, and at least one processor configured to execute the program to receive a first message from user equipment (UE), the first message including at least one of a medium access control (MAC) packet data unit (PDU) that includes a common control channel (CCCH) service data unit (SDU) or a cell radio network temporary identifier (C-RNTI), or a random access preamble, transmit a physical downlink control channel (PDCCH) for a second message corresponding to the first message to the UE within a configured time window, and transmit the second message based on a PDCCH for the first and second messages to the UE within the configured time window.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
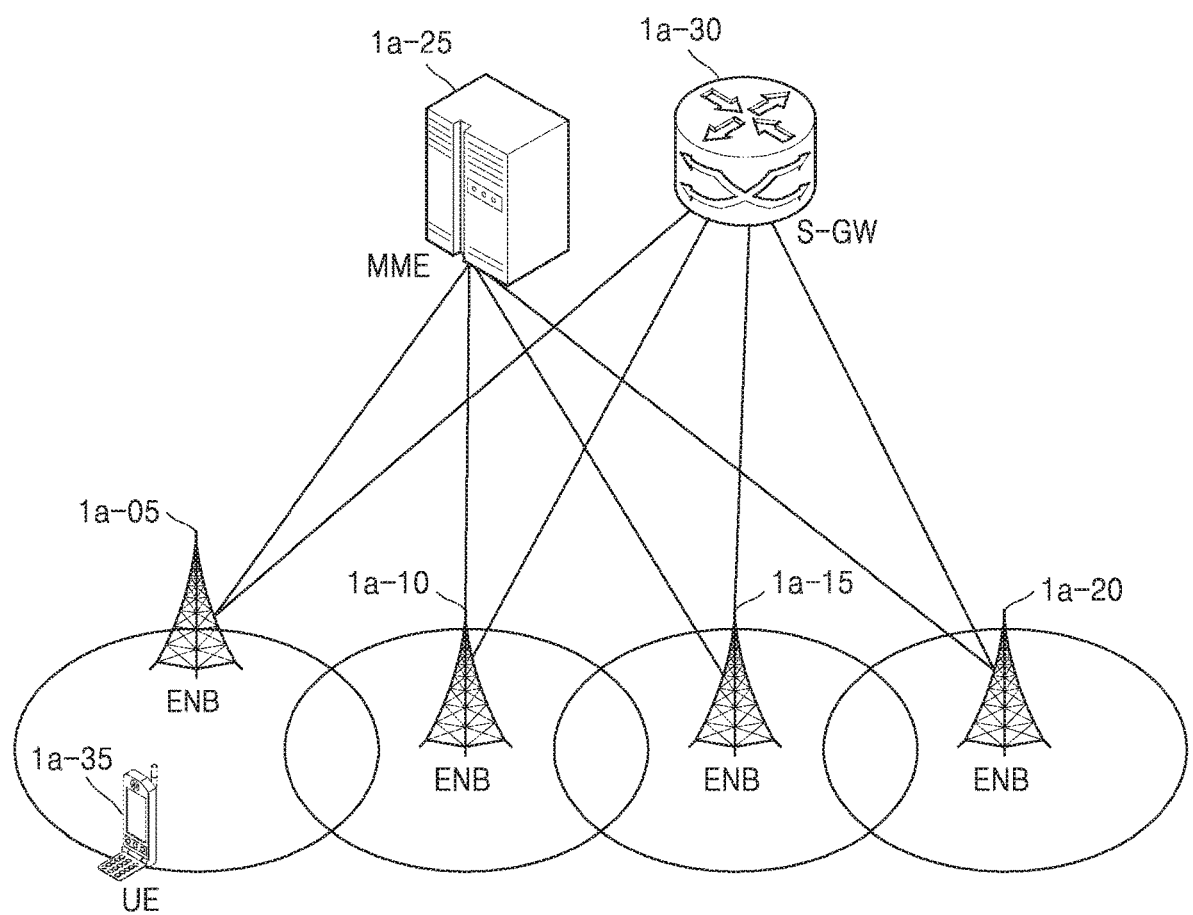
FIG. 1 is a network diagram of a long-term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments of the disclosure, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list.

Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, or a multimedia system capable of performing communication functions. In the disclosure, a DL is a wireless transmission path of a signal transmitted from a base station to a terminal, and a UL is a wireless transmission path of a signal transmitted from a terminal to a base station. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, for example, 5th generation (5G) or new radio (NR) communication system, instead of the LTE or LTE-A system.

As a future communication system after the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLLC), etc.

The eMBB requirements like tens of Gbps data rate, low latency, high mobility so on and so forth address the market segment representing the wireless broadband subscribers needing internet connectivity everywhere, all the time and on the go, according to the related art. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

Those three services considered in the aforementioned 5G communication system, i.e., eMBB, URLLC, and mMTC, may be multiplexed and transmitted from a single system. In this case, to meet different requirements for the three services, different transmission or reception schemes and parameters may be used between the services. The mMTC, URLLC, and eMBB are an example of different types of services, and embodiments of the disclosure are not limited to the service types.

FIG. 1 is a network diagram of an LTE system according to an embodiment of the disclosure.

The structure of an LTE system as described herein may also be applied to an NR system.

Referring to FIG. 1, an LTE wireless communication system may include a number of base stations (also referred to as eNBs) 1a-05, 1a-10, 1a-15, and 1a-20, a mobility management entity (MME) 1a-25, and a serving gateway (S-GW) 1a-30. A UE or a terminal 1a-35 may access an external network via the base stations 1a-05, 1a-10, 1a-15, or 1a-20, and the S-GW 1a-30.

The base stations 1a-05, 1a-10, 1a-15, and 1a-20 are access nodes of a communication network to enable UEs to wirelessly access one or more communication networks. The base stations 1a-05, 1a-10, 1a-15, and 1a-20 may collect status information, such as buffer states of UEs, available transmission power states, channel conditions, etc., to provide service traffic to UE 1a-35, and support connection between the UE 1a-35 and a core network (CN) including the MME 1a-258 and the S-GW 1a-30 by scheduling resources for communication between the UE 1a-35 and one or more base stations 1a-05, 1a-10, 1a-15, and 1a-20. The MME 1a-25 is a network device responsible for various control operations as well as mobility management functionality for the UE 1a-35, and may be connected to or in communication with one or more of the base stations 1a-05, 1a-10, 1a-15, and 1a-20. The S-GW 1a-30 is a network device for providing a data bearer. The S-GW 1a-30 may further perform authentication of a UE accessing the network, bearer management, etc., and process packets to be transmitted to the UE 1a-35 via the base stations 1a-05, 1a-10, 1a-15, or 1a-20 or packets received from the UE 1a-35 via the base stations 1a-05, 1a-10, 1a-15, or 1a-20.

Figure 2:
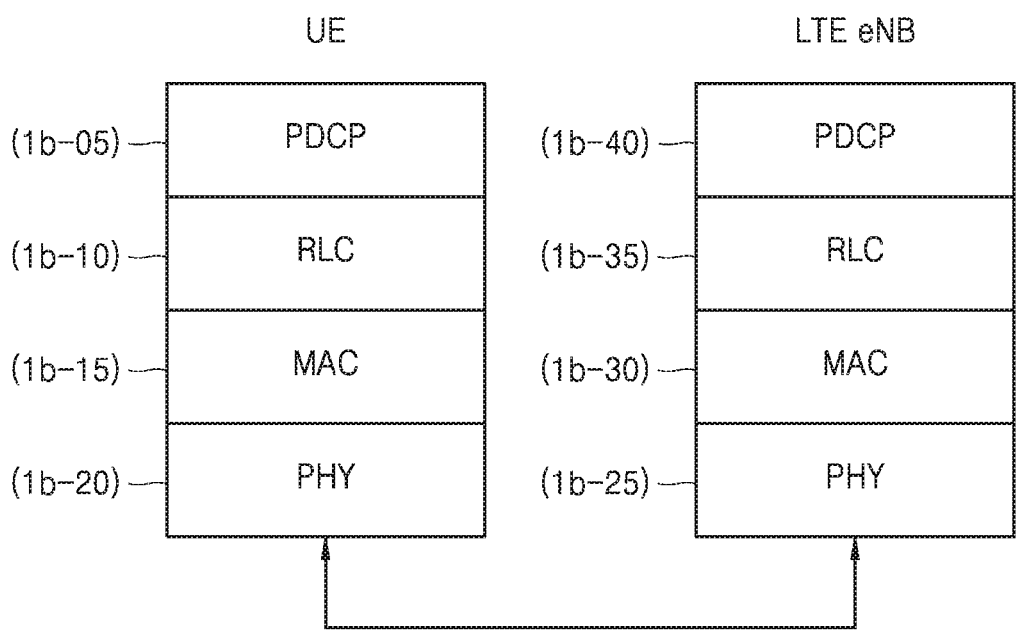
FIG. 2 is a radio protocol architecture for an LTE or New Radio (NR) system according to an embodiment of the disclosure.

FIG. 2 is a radio protocol architecture for an LTE or New Radio (NR) system according to an embodiment of the disclosure.

Referring to FIG. 2, the radio protocol for an LTE or NR system may include, for each UE and eNB/gNB, a packet data convergence protocol (PDCP) 1b-05 or 1b-40, a radio link control (RLC) 1b-10 or 1b-35, and a medium access control (MAC) 1b-15 or 1b-30.

The PDCP 1b-05 or 1b-40 may perform an operation, e.g., IP header compression/decompression. The RLC 1b-10 or 1b-35 may reconfigure a PDCP packet data unit (PDU) into a suitable size. The MAC 1b-15 or 1b-30 may be connected to a number of RLC layers configured in a single UE, for multiplexing RLC PDUs to a MAC PDU and demultiplexing RLC PDUs from a MAC PDU. Hereinafter, a layer of the radio protocol may also be referred to as an entity.

A physical layer PHY 1b-20 or 1b-25 may perform channel coding and modulation on upper layer data, generate a signal including the data mapped to orthogonal frequency divisional multiplexing (OFDM) symbols, and transmit the signal including the OFDM symbols on a radio channel, or may demodulate a signal including OFDM symbols received on a radio channel, perform channel decoding, and transmit the resulting data to an upper layer. Furthermore, the PHY 1b-20 or 1b-25 may use the hybrid automatic repeat request (HARQ) for additional error correction such that a receiving device may transmit an indication as to whether a packet has been received from a transmitting device in one bit. This may be called HARQ ACK/NACK information or messages. Downlink HARQ ACK/NACK information for uplink data transmission is transmitted on a physical hybrid-ARQ Indicator channel (PHICH) for the LTE system, and whether retransmission or new transmission is required may be determined based on scheduling information for the corresponding UE on a physical downlink control channel (PDCCH), on which downlink/uplink resource allocations are transmitted for the NR system. This is because an asynchronous HARQ may be applied to the NR system. Uplink HARQ ACK/NACK information for downlink data transmission may be transmitted on a physical uplink control channel (PUCCH) or physical uplink shared channel (PUSCH).

In LTE systems, carrier aggregation (CA) may be implemented to increate bandwidth and bitrate within the communication system. CA may allow a UE to simultaneously communicate with a plurality of base stations. In CA, a cell of a base station may use a primary component carrier in a primary cell (PCell) and a cell of the base station that may use a subcarrier or a secondary component carrier in a secondary cell (SCell).

When CA is implemented, PUCCH may be used for uplink transmission in the PCell. However, as will be described below, a SCell base station may allow the UE to use a PUCCH for additional transmissions in the SCell, which may be referred to as a PUCCH-SCell.

Although not shown, there are RRC layers above the PDCP layers 1b-05 or 1b-40 of the UE and the base station, and the RRC layers may exchange control messages related to access and measurement for radio resource control.

The PHY layer 1b-20 or 1b-25 may include one or multiple frequencies/carriers when CA is implemented, such that a single base station may be capable of assigning and using multiple frequencies simultaneously. Unlike a single carrier being used for communication between a UE and a base station, i.e., an Evolved Universal Terrestrial Radio Access Network (E-UTRAN) NodeB (eNB), CA may use a primary carrier and one or multiple secondary carriers, thereby increasing the amount of data transmission by using the number of secondary carriers.

Furthermore, in a NR system, a concept of bandwidth parts (BWPs) may be introduced a single wide frequency bandwidth to be divided up to allow for more flexible resource allocation. For example, when the UE uses a single serving cell (i.e., there is only a PCell), the resources of a single serving cell may be divided up to operate multiple BWPs such that different signals or signal types may be transmitted in each BWP. For example, one or more of the multiple BWPs may be activated to transmit or receive data.

In LTE systems, carrier aggregation (CA) may be implemented to increase bandwidth and bitrate within the communication system. CA may allow a UE to simultaneously communicate with a plurality of base stations. In CA, a cell of a base station may use a primary component carrier in a primary cell (PCell) and a cell of the base station that may use a subcarrier or a secondary component carrier in a secondary cell (SCell).

When CA is implemented, PUCCH may be used for uplink transmission in the PCell. However, as will be described below, a SCell base station may allow the UE to use a PUCCH for additional transmissions in the SCell, which may be referred to as a PUCCH-SCell.

Figure 3:
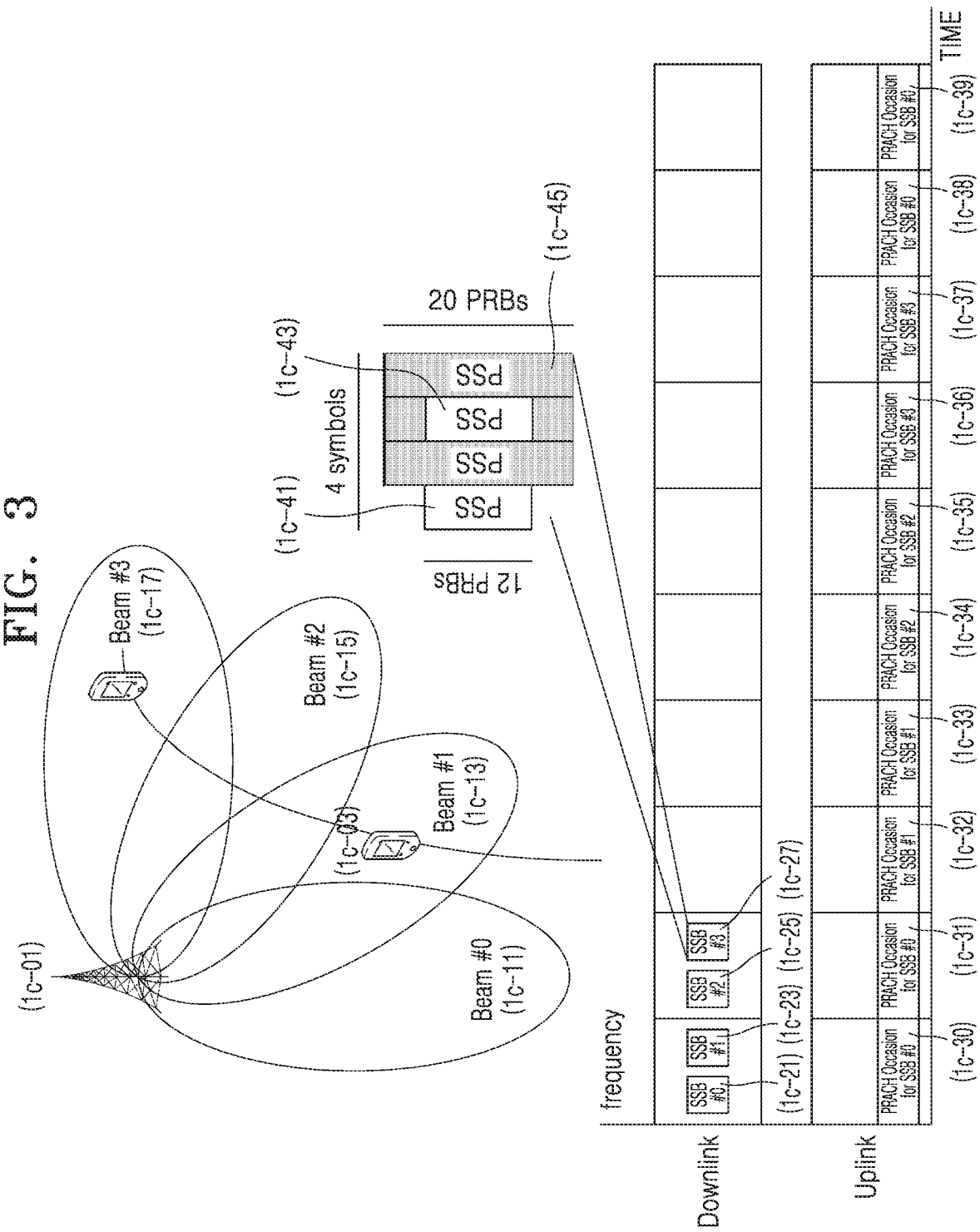
FIG. 3 shows an example of downlink and uplink channel frame structures for beam-based communication in an NR system, according to an embodiment of the disclosure.

FIG. 3 shows an example of downlink and uplink channel frame structures for beam-based communication in an NR system, according to an embodiment of the disclosure.

Referring to FIG. 3, a base station (BS) 1c-01 may transmit signals in the form of beams 1c-11, 1c-13, 1c-15, and 1c-17 for wider coverage or strong signaling. In this case, a UE 1c-03 located in a cell may need to transmit or receive data by using particular beam transmitted by the BS 1c-01 (in FIG. 3, beam #1 1c-13).

In the meantime, depending on whether the UE is connected to the BS, the UE may be classified as being in a sleeping state (or idle state) RRC_IDLE or being in a connected state RRC_CONNECTED. The BS may not know where the UE is when the UE is in the idle state.

When the UE 1c-03 intends to be changed into the connected state from the idle state, the UE 1c-03 may receive synchronization signal blocks (SSB) 1c-21, 1c-23, 1c-25, and 1c-27 transmitted from the BS 1c-01. The SSBs may be SSB signals periodically transmitted at certain intervals set by the BS, and each of the SSBs may include a primary synchronization signal (PSS) 1c-41, a secondary synchronization signal (SSS) 1c-43, and a physical broadcast channel (PBCH) 1c-45.

In FIG. 3, a scenario where each beam carries an SSB is assumed. For example, assume that beam #0 1c-11 is used to transmit the SSB #0 1c-21; beam #1 1c-13 is used to transmit the SSB #1 1c-23; beam #2 1c-15 is used to transmit the SSB #2 1c-25; beam #3 1c-17 is used to transmit the SSB #3 1c-27. It is also assumed that the UE is in the idle state and located under beam #1 1c-13 in FIG. 3, but even when the UE is in the connected state and performs random access, the UE selects an SSB received at a time of performing random access.

Referring to FIG. 3, the UE 1c-03 may receive SSB #1 1c-23 transmitted in beam #1. On receiving SSB #1 1c-23, the UE 1c-03 may obtain a physical cell identifier (PCI) of the BS 1c-01 from the PSS or the SSS, and on receiving the PBCH, the UE 1c-03 may know of an identifier of the SSB (e.g., SSB #1) currently received and where the SSB is located in a 10 ms fame as well as at which system frame number (SFN) the SSB is located among SFNs in a 10.24 s period. Furthermore, the PBCH may include a master information block (MIB), and the MIB may include information indicating a location at which a system information block type 1 (SIB1) that broadcasts more detailed setting information of the cell may be received. On receiving the SIB1, the UE 1c-03 may know of the total number of SSBs transmitted by the BS 1c-01, and locations of physical random access channel (PRACH) occasions (e.g., 1c-30 to 1c-39 of FIG. 3, which are allocated at intervals of 1 ms) to perform random access for the UE to be changed into the connected state (more specifically, to transmit a preamble, which is a physical signal designed to be in sync with uplink transmission).

In addition, the UE 1c-03 may determine which of the PRCH occasions is mapped to which SSB index based on the information of the SIB1. For example, in FIG. 3, it is assumed that the PRCH occasions are allocated at intervals of 1 ms as described above, and that ½ SSB is allocated for each PRACH occasion (i.e., two PRACH occasions for each SSB). In other words, FIG. 3 shows a scenario where two PRACH occasions are allocated for each SSB from the beginning of the PRACH occasions starting with an SFN. For example, PRACH occasions 1c-30 and 1c-31 may be allocated for SSB #0, and PRACH occasions 1c-32 and 1c-33 may be allocated for SSB #1. After all the SSBs are set, subsequent PRACH occasions 1c-38 and 1c-39 may be allocated for the first SSB (SSB #0).

Accordingly, the UE 1c-03 may recognize locations of the PRACH occasions 1c-32 and 1c-33 for SSB #1, and accordingly, may transmit a random access preamble on the earliest PRACH occasion 1c-32 from the current point of time among the PRACH occasions 1c-32 and 1c-33 for SSB #1. On receiving the preamble on the PRACH occasion 1c-32, the BS 1c-01 may determine that the UE 1c-03 has selected the SSB #1 and then transmitted the preamble, and may transmit or receive data through the beam corresponding to the SSB #1 during the subsequent random access.

Even when the UE 1c-03, in the connected state, moves to a target BS from the current (source) BS for e.g., handover, the UE 1c-03 may transmit random access preamble to the target BS by selecting an SSB. In addition, during the handover, the source BS may transmit a handover command to the UE 1c-03 to move to the target BS, in which case in the handover command message, a random access preamble identifier dedicated to the UE 1c-03 may be allocated for each SSB of the target BS to be used when performing random access to the target BS. In this case, the BS may not allocate the dedicated random access preamble identifier for all the beams (e.g., based on a current location of the UE), and accordingly, some SSBs may not be allocated the dedicated random access preamble. For example, the dedicated random access preamble is allocated only for beam #2 and beam #3.

When the dedicated random access preamble is not allocated to an SSB selected by the UE for preamble transmission, a contention-based random access preamble may be temporarily selected to perform random access. For example, referring to FIG. 3, there may be a scenario where the UE may transmit a dedicated preamble at the location of beam #3 for retransmission of a random access preamble after failing to perform random access in the first location of beam #1. That is, when preamble retransmission occurs even in a random access procedure, there may be a mixture of a contention-based random access procedure and a contention-free-based random access procedure depending on whether a dedicated random access preamble is allocated for a selected SSB for each preamble transmission.

Figure 4:
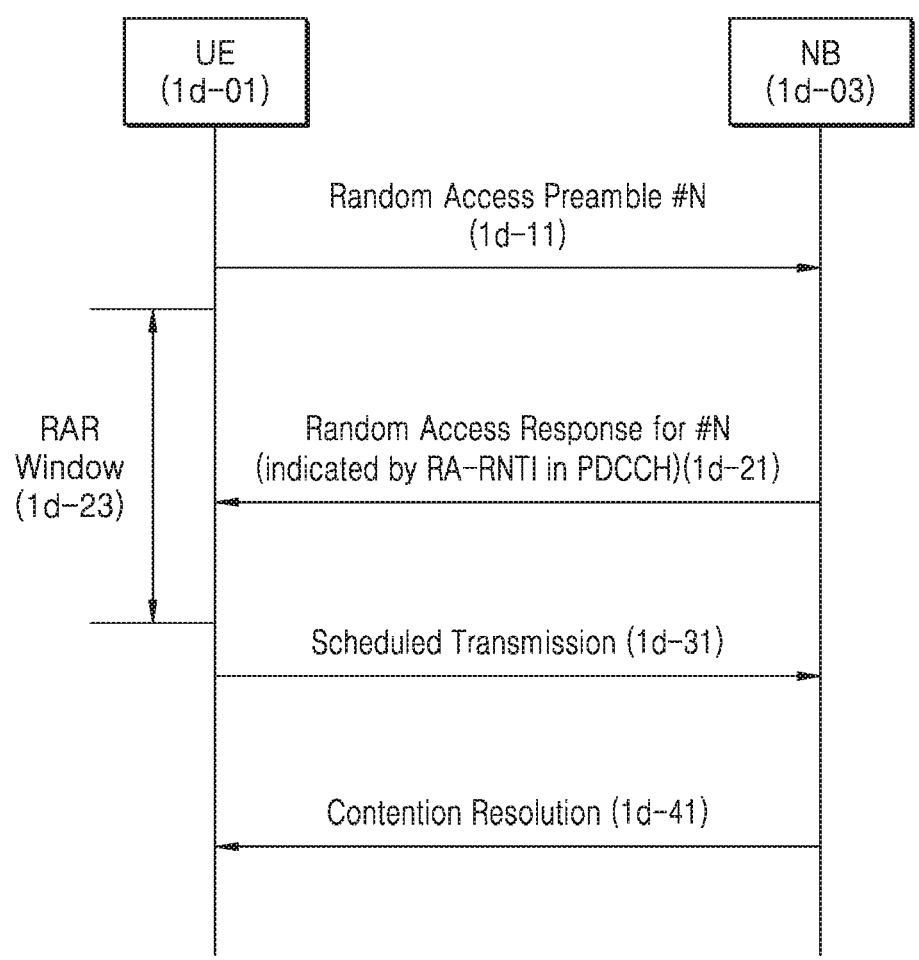
FIG. 4 shows a contention-based four-step random access procedure performed by user equipment (UE) for initial connection, reconnection, handover, or various occasions requiring random access, according to an embodiment of the disclosure.

FIG. 4 shows a contention-based four-step random access procedure performed by user equipment (UE) for initial connection, reconnection or handover to a BS, or various occasions requiring random access, according to an embodiment of the disclosure.

To access a BS 1d-03, a UE 1d-01 selects a PRACH as described above in connection with FIG. 3, and transmits a random access preamble in the PRACH, in 1d-11. In an embodiment of the disclosure, there may be an occasion when one or more UEs 1d-01 simultaneously transmit random access preambles in the PRACH resource. The PRACH resource may span over one subframe, or only some symbols in one subframe may be used.

Furthermore, in an embodiment of the disclosure, information about the PRACH resource may be included in system information broadcast by the BS 1d-03, so that the UE 1d-01 may determine time and frequency resources at which to transmit the preamble. The random access preamble may be a particular sequence designed to be received even when it is transmitted before completely synchronized with the BS 1d-03, and may have a plurality of preamble indexes according to the standard. When there are a plurality of preamble indexes, the preamble to be transmitted by the UE 1d-01 may be randomly selected by the UE 1d-01 or may be designated by the BS 1d-03.

When the BS 1d-03 receives the preamble, the BS 1d-03 transmits a random access response (RAR) message (also referred to as Msg2) to the UE 1d-01 in response to reception of the preamble, in 1d-21. The Msg2 may include a random access preamble identifier (RAPID) of the preamble used in 1d-11, timing advance (TA) information used to control uplink transmission timing, uplink grant (UL grant) information to be used at a later step, i.e., 1d-31, temporary UE identification information TC-RNTI, or the like.

In an embodiment of the disclosure, for example, when a plurality of UEs transmit different preambles to attempt random access in 1d-11, the RAR message may include responses to the respective preambles and the RAPID may be included in the RAR message to indicate a preamble targeted by the response. The UL grant information included in each response for each preamble may be detailed information of a resource to be used by the UE in 1d-31, and may include physical location and size of the resource, a modulation and coding scheme (MCS) used for transmission, power control information for transmission, etc. When a UE that transmitted a preamble attempts initial connection and the UE does not have an identifier allocated by a BS for communication with the BS, the TC-RNTI information may be transmitted to be used as the identifier.

Several RAR messages for various Random Access Preambles detected by gNB can be multiplexed in the same RAR MAC PDU by gNB. An RAR message in MAC PDU corresponds to UE's Random Access Preamble transmission when it includes RAPID of Random Access Preamble transmitted by it. When the RAR message corresponding to its Random Access Preamble transmission is not received during the RAR window and UE has not yet transmitted the Random Access Preamble for a configurable (configured by gNB in RACH configuration) number of times, UE retransmits the Random Access Preamble.

When the RAR message corresponding to its Random Access Preamble transmission is received and UE has transmitted a dedicated Random Access Preamble, RA procedure is considered successful. When the UE has transmitted a non-dedicated (i.e. contention based) Random Access Preamble then upon successful reception of RAR, UE transmits Msg3 in UL grant received in RAR message. After transmitting the Msg3, UE starts a contention resolution timer. While the contention resolution timer is running, when UE receives a PDCCH addressed to C-RNTI included in Msg3, contention resolution is considered successful, contention resolution timer is stopped and RA procedure is completed. While the contention resolution timer is running, when UE receives contention resolution MAC CE including the UE's Contention Resolution Identity (first X bits of CCCH SDU transmitted in Msg3), contention resolution is considered successful, contention resolution timer is stopped and RA procedure is completed. When the contention resolution timer expires and UE has not yet transmitted the Random Access Preamble for a configurable number of times, UE retransmits the Random Access Preamble.

In the meantime, the RAR message may include, optionally, a backoff indicator (BI) in addition to the response(s) to the preamble(s). When the random access is not successful so the random access preamble needs to be retransmitted, the BI may be transmitted to delay the transmission randomly by the value of the BI without immediately retransmitting the preamble.

Specifically, when the UE did not properly receive the RAR message or contention, which will be described later, was not resolved, the UE may need to retransmit the random access preamble. At this time, a value indicated by the BI may be one of index values in the following table 1, in which case, the UE may select a random value in a range from 0 to the index value and retransmit the random access preamble after as much time as the selected random value. For example, when the BS indicates 5, i.e., 60 ms, for the BI and the UE randomly selects 23 ms in a range between 0 to 60 ms, the UE stores the selected value 23 ms for a variable PREAMBLE_BACKOFF and performs a procedure of retransmitting the preamble after 23 ms. When the BI has not been transmitted and the UE needs to retransmit the random access preamble after the failure of random access, the UE may transmit the random access preamble immediately.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

The RAR message needs to be transmitted within a certain period from after a certain time after the preamble is transmitted, and the certain period from after the certain time after the preamble is transmitted is called an RAR window.

The RAR window may be a time period starting from after a certain time after the first preamble is transmitted. The certain time may be equal to or less than a subframe unit, 1 ms. The RAR window may have certain width set by the BS for each PRACH resource or for each set of one or more PRACH resources in the system information message that the BS broadcasts.

In the meantime, the BS may schedule an RAR message in a PDCCH when transmitting the RAR message, and the scheduling information may be scrambled with a random access radio network temporary identifier (RA-RNTI). The RA-RNTI may be mapped to the PRACH resource used in transmitting the message 1$d$-11, so the UE that has transmitted a preamble in a particular PRACH resource may try PDCCH reception based on the RA-RNTI and determine whether there is a corresponding RAR message. When the RAR message is a response to the preamble transmitted by the UE in 1$d$-11 as shown in FIG. 4, the RAN-RNTI used in the RAR message scheduling information may include information regarding the transmission 1$d$-11. For this, the RA-RNTI may be calculated in the following equation. It is, of course, not limited thereto.

$$\text{RA-RNTI} = 1 + s\_id + 14 \times t\_id + 14 \times 80 \times f\_id + 14 \times 80 \times 8 \times ul\_carrier\_id \quad \text{Equation 1}$$

where s_id denotes an index corresponding to the first OFDM symbol after the preamble transmission begins in 1$d$-11, and may have a value $0 \leq s\_id < 14$ (which is the maximum number of OFDM symbols in a slot).

t_id denotes an index corresponding to the first slot after the preamble transmission begins in 1$d$-11, and may have a value $0 \leq t\_id < 80$ (which is the maximum number of slots in a 10 ms system frame).

Furthermore, f_id indicates nth PRACH resource in frequency, in which the preamble is transmitted in 1$d$-11, and may have a value $0 \leq f\_id < 8$ (which is the maximum number of PRACHs in frequency within the same time).

ul_carrier_id denotes a parameter to determine whether the preamble is transmitted in normal uplink (NUL) (which is 0) or in supplementary uplink (SUL) (which is 0) when two uplink carriers are used for a cell.

On receiving the RAR message, the UE transmits different messages for different purposes as described above in a resource allocated in the RAR message, in 1$d$-31. As shown in FIG. 4, the message transmitted for the third time is also called Msg3. The preamble in 1$d$-11 or 1$d$-13 and the RAR message in 1$d$-21 are also called Msg1 and Msg2, respectively. For example, Msg3 transmitted by the UE may include a message of the RRC layer, RRCSetupRequest message for initial connection, RRCReestablishmentRequest mesage for reconnection, or RRCReconfigurationComplete message for handover. Furthermore, Msg3 may include RRC handover confirmation, scheduling request, UE identity (i.e. C-RNTI or S-TMSI or a random number), a CCCH (Common Control Channel) SDU (Service Data Unit), without being limited thereto. A buffer status report (BSR) message for resource request may also be transmitted in Msg3.

Subsequently, the UE may receive a contention resolution message from the BS for initial connection (i.e., in a case that a BS identifier information allocated for the UE is not included in the Msg3) in 1$d$-41. The contention resolution message may include what is transmitted by the UE in the Msg3 as is, to indicate which UE is to receive the response even when there is a plurality of UEs having selected the same preamble in 1$d$-11 or 1$d$-13. In this case, the UE may monitor the PDCCH based on the TC-RNTI. Furthermore, when the C-RNTI is received in the Msg3, the PDCCH may be monitored based on the C-RNTI.

Figure 5:
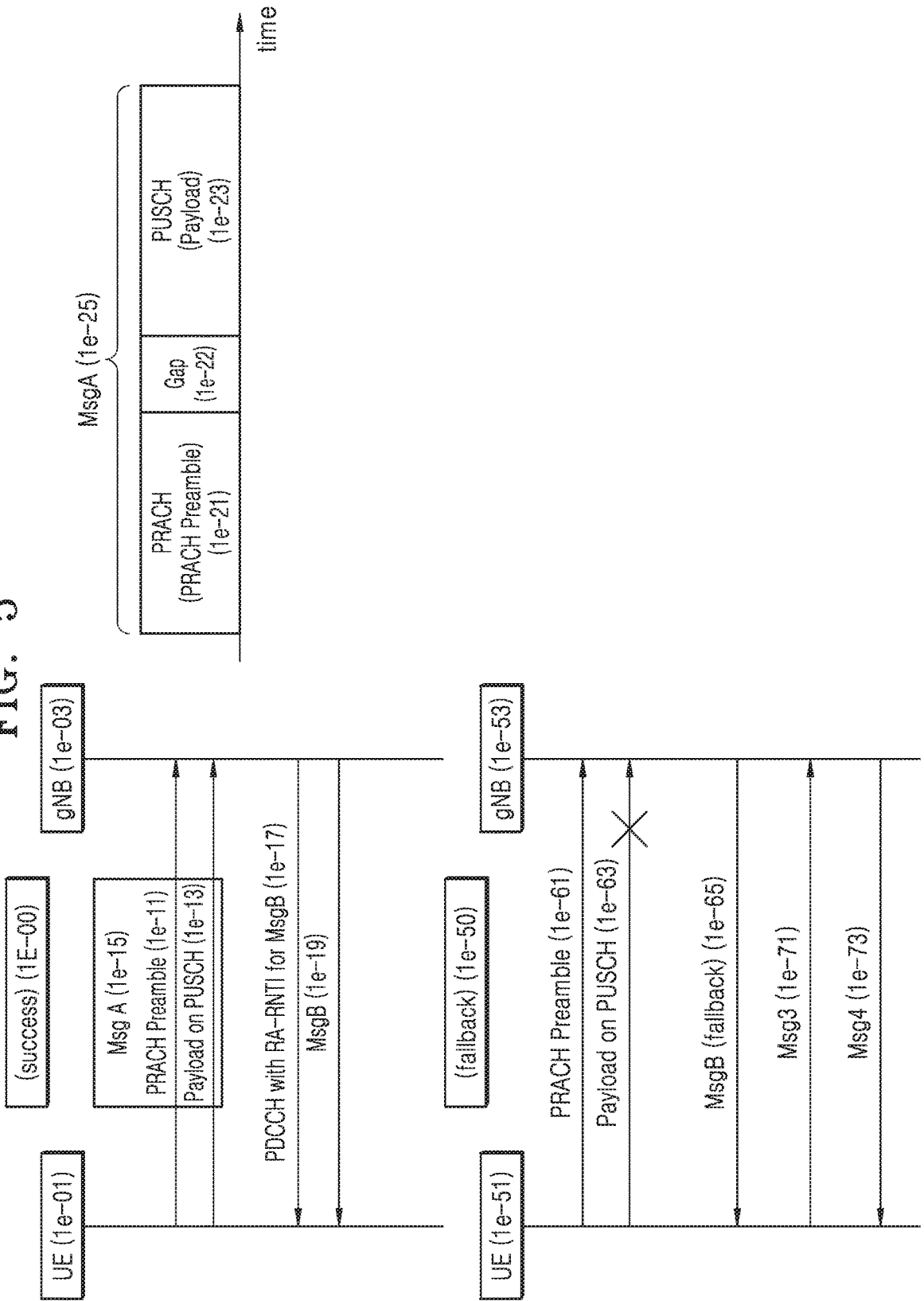
FIG. 5 shows a two-step random access procedure performed by UE, according to an embodiment of the disclosure.

FIG. 5 shows a two-step random access procedure performed by UE, according to an embodiment of the disclosure.

As described above in connection with FIG. 4, when normal contention-based random access is performed, a minimum of four steps are performed, and when a failure of one of the steps occurs, a procedure thereof may be further delayed. Hence, a scenario may be considered to reduce the random access procedure into two steps. Especially, in the 5$^{th}$ generation (also referred to as NR or New Radio) wireless communication system, a Contention-free RA (CFRA) Procedure is also supported. Contention free RA procedure is used for scenarios such as handover where low latency is required, timing advance establishment for Scell, etc. ENB assigns to UE non-contention RA preamble in dedicated signaling. UE transmits the assigned non-contention RA preamble. ENB/GNB transmits the RAR message on PDSCH addressed to RA-RNTI. RAR message conveys RA preamble identifier and Timing alignment information. RAR message may also include UL grant. RAR message is transmitted in RAR window similar to contention based RA procedure. Contention free RA procedure terminates after receiving the RAR message.

In order to reduce the latency of 4 step CBRA procedure, a 2 step CBRA procedure is being studied. In the 2 step CBRA procedure, in the first step UE transmits random access preamble on PRACH and a payload on PUSCH. In this disclosure, the random access preamble and payload transmission together is also referred as MsgA (or Msg1) in 2 step CBRA procedure. In the second step, after MsgA (or Msg1) transmission, the UE monitors for a response from the network within a configured window. In this disclosure, the response is also referred as MsgB (or Msg2) in 2 step CBRA procedure. In the 2 step CBRA procedure, UE 1$e$-01 sends additional information such as UE ID in the payload part of MsgA or Msg1. In the 2 step CBRA procedure, one or more types of information such as RRC message, buffer status report, power head room report, UL data, UE IDs etc. can be included in Msg 1 depending on the UE's RRC state (i.e. idle, inactive or connected) or events (such as scheduling request, PDCCH order, beam failure recovery etc.) that triggered the RA procedure. In the 2 step RA procedure which comprise of MsgA and MsgB as explained above, dedicated preamble and/or PUSCH resource can be assigned to UE for MsgA transmission. Also, in this case 2 step RA procedure comprising of MsgA and MsgB is contention free as there is no contention for MsgA. Similar to 2 step CBRA, in CFRA procedure also additional information can be transmitted in first step in addition to preamble and this first step including transmission of additional information is referred as MsgA or Msg1 in 2 step CFRA procedure.

In the 4 step CB RA procedure, RA procedure is completed when UE receives PDCCH addressed to C-RNTI indicating UL grant for new transmission. In 2 step CF RA procedure, RA procedure is completed when UE receives PDCCH addressed to RA-RNTI and RAR including the RAPID corresponding to transmitted preamble.

Specifically, MsgA 1$e$-25 is transmitted in 1$e$-15 where the preamble on PRACH and a payload (i.e. MAC PDU) on PUSCH are transmitted in 1$e$-11 (corresponding to 1$d$-11) and 1$e$-13 (corresponding to 1$d$-13), and subsequently, on receiving the MsgA, the BS (gNB 1$e$-03) may transmit MsgB in 1$e$-19 wherein contention resolution is performed using MsgB thereby reducing the random access procedure. This procedure is illustrated in FIG. 5 as 1$e$-00.

In this case, the MsgA may be represented in time as having the preamble and MAC PDU transmitted separately on PRACH and PUSCH respectively. For example, the preamble part of MsgA may be transmitted using a PRACH resource 1e-21, a PUSCH resource 1e-23 to transmit the payload (i.e. MAC PDU) of MsgA, and a gap resource 1e-22 to resolve an interference problem that may arise in transmission of PUSCH resource.

On receiving both preamble and MAC PDU included in the MsgA, the BS may transmit MsgB including contention resolution information to the UE, in 1e-19. In this case, the aforementioned BI may be included in the MsgB.

On the other hand, the BS (gNB 1e-53) may receive preamble 1e-61 but not MAC PDU 1e-63 in the MsgA from the UE 1e-51 in 1e-15, e.g., due to collisions occurring when multiple MsgA's are transmitted. The BS having failed to receive the MAC PDU may perform the remaining random access procedure by transmitting the MsgB including fallback indication (1e-65), receiving Msg 3 and transmitting Msg 4 1e-73 to change the random access procedure into four steps as described above in connection with FIG. 4. This is illustrated in 1e-50 of FIG. 5, and such a mode of changing the two-step random access to the four-step random access is referred to as a fallback mode.

Moreover, as for content included in the MsgB, when the UE has not yet established connection with the BS (e.g., to be changed from the idle state to the connected state) and the MsgA includes a CCCH related message, e.g., messages of the RRC layer such as RRCSetupRequest, RRCResumeRequest, RRCReestablishmentRequest, RRCSystemInfoRequest, there may be uplink transmission timing information such as a TA command (TAC), and a temporary C-RNTI (TC-RNTI) of the UE to be later used by the BS, and contention resolution related information such as UE contention resolution identity included in the MsgB. Furthermore, when the UE has already been connected to the BS and transmits C-RNTI MAC CE including the identity information of the UE in the MsgA, a message itself in which the BS allocates a resource for the UE through a PDCCH with the C-RNTI of the UE may be the MsgB.

In the meantime, as described above in connection with FIG. 4, UE may perform random access for different purposes. For example, the UE may perform random access to transmit messages for making connection with the BS when the UE has not yet been connected to the BS, or for recovering connection with the BS when the UE had been connected to the BS but has been disconnected from the BS due to an error. The messages for recovering connection may belong to the CCCH. A control message belonging to the CCCH may include RRCSetupRequest (at the time of being changed into the connected state from the idle state (RRC_IDLE)), RRCResumeRequest (at the time of being changed into the connected state from an inactive state (RRC_INACTIVE)), RRCReestablishmentRequest (at the time of recovering connection), or RRCSystemInfoRequest (at the time of requesting system information that the BS broadcasts), without being limited thereto. When the UE has not yet established connection with the BS and the MsgA includes a CCCH, the MsgB may include uplink transmission timing information such as a TAC as described above, and a temporary identifier of the UE to be later used by the BS such as TC-RNTI, and contention resolution related information such as UE contention resolution identity.

On the other hand, when the UE is normally connected to the BS, the UE may transmit or receive messages belonging to a dedicated control channel (DCCH) and a dedicated traffic channel (DTCH) in the connected state, RRC_CONNECTED. The UE may transmit a BSR message indicating that there is data for uplink transmission to the BS to request uplink resource allocation. For this, the BS may allocate a dedicated PUCCH resource for the UE to transmit a scheduling request (SR) for a particular logic channel. Then, when receiving the SR from the UE on the PUCCH, the BS may allocate an uplink resource for the UE to transmit the BSR, and when receiving the BSR in the uplink resource, the BS may determine a buffer status of the UE and accordingly, allocate an uplink resource for data.

In the meantime, when the BS has not allocated a PUCCH dedicated for the SR for a particular logic channel (a logical concept distinguished by data type, such as control data or normal data) or the UE fails to transmit the BSR because the UE is not allocated an uplink resource even after the UE has transmitted the SR as many as maximum transmission times, the UE may perform random access to transmit the BSR.

In the embodiments of the disclosure, the 2 step RA procedure comprising of Msg1 (also referred as MsgA) and Msg2 (also referred as MsgB) refers to a procedure in which Msg1 may include UE ID (e.g. Random ID, S-TMSI, C-RNTI, Resume ID, etc.) with or without random access (or RACH or RA) preamble. The UE ID can be one of Random ID, S-TMSI, C-RNTI, Resume ID, IMSI, idle mode ID, Inactive Mode ID, I-RNTI etc. The UE ID can be different in different embodiments in which UE performs the 2 step RA procedure. When UE performs 2 step RA procedure after power on (before it is attached/registered to the network) then the UE ID is the random ID. When UE perform 2 step RA procedure in IDLE state after it is attached/registered to the network, the UE ID is S-TMSI. When UE has an assigned C-RNTI (e.g. in connected state) the UE ID is C-RNTI. In case UE is in INACTIVE state, the UE ID is resume ID. In addition to the UE ID some addition control information can be transmitted in Msg1. The control information may include one or more of connection request indication, Connection (re-)establishment cause, Connection resume request indication, SI request indication, Information about SI message(s) requested, buffer status indication/report, Beam Information (e.g. one or more DL TX beam ID(s) or SSB ID(s)), beam failure recovery indication/information, data indicator, cell/BS/TRP switching indication, connection re-establishment indication, reconfiguration complete or handover complete message, etc. Note that any other control information is not precluded. In case Msg1/MsgA includes dedicated RACH preamble, UE ID can be skipped (i.e. not included) in Msg1/MsgA. In this case gNB can identify the UE based on dedicated preamble. In the disclosure, the 4 step RA procedure refers to legacy RA procedure comprising of Msg1 to Msg4 as described in TS 38.321 and TS 36.321 specifications.

Although messages used in the two-step random access procedure are called MsgA and MsgB in the above description, MsgA and MsgB may also be called Msg1 and Msg2, respectively. In the following description to explain the two-step random access procedure, the terms Msg1 and Msg2 will be used. Note that Msg1 in 2 step random access procedure is not same as Msg1 and Msg2 of legacy random access procedure.

In the following description, criteria for successful completion of 2 step RA procedures are described.

After transmitting the Msg1 (i.e. MsgA) in 2 step RA procedure, UE monitors PDCCH for Msg2 (i.e. MsgB) reception in a time window (also referred as response window or Msg2 reception window). In an embodiment of the disclosure, UE monitors PDCCH for Msg2 reception in a time window wherein the time window starts at an offset from the end of the Msg1 transmission (i.e. from end of PUSCH occasion in which payload/MAC PDU part of Msg1 is transmitted). In an embodiment of the disclosure, the offset may have a value equal to or greater than zero. Time window can start at the first PDCCH occasion for receiving network response that is at least one symbol away from the end of PUSCH transmission in Msg1. The size of the time window is signaled by gNB in SI or RRC signaling. When Msg2 is not successfully received in the time window, upon expiry of the time window Msg1 transmission is considered as failed. In another embodiment of the disclosure, UE monitors PDCCH for Msg2 reception immediately after transmitting the Msg1. UE starts a timer after transmitting the Msg1. When Msg2 is not successfully received before the timer expires, Msg1 transmission is considered as failed. The value of timer is signaled by gNB in SI or RRC signaling. The timer is stopped upon receiving the Msg2 successfully.

Embodiment 1

Figure 6:
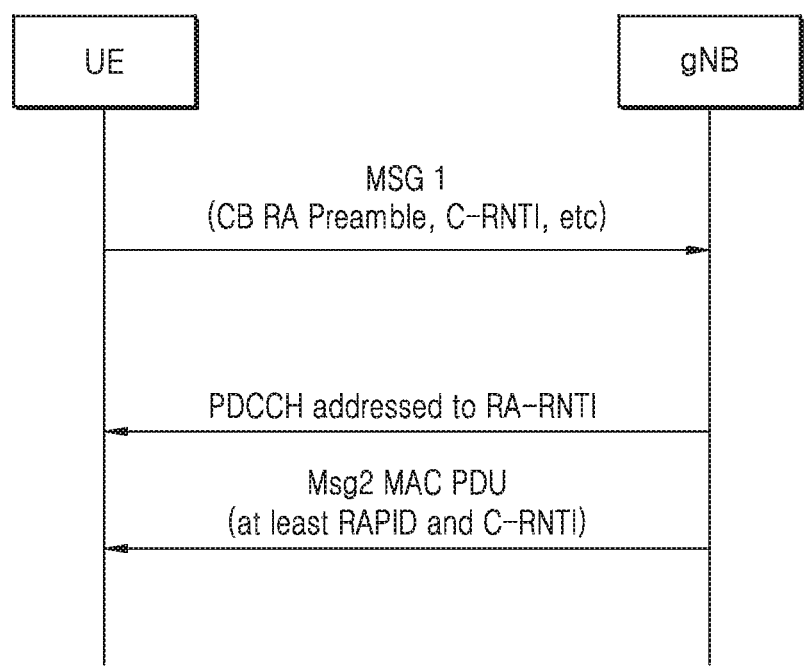
FIG. 6 is a flowchart illustrating a random access procedure in a wireless communication system according to an embodiment of the disclosure.
Figure 7:
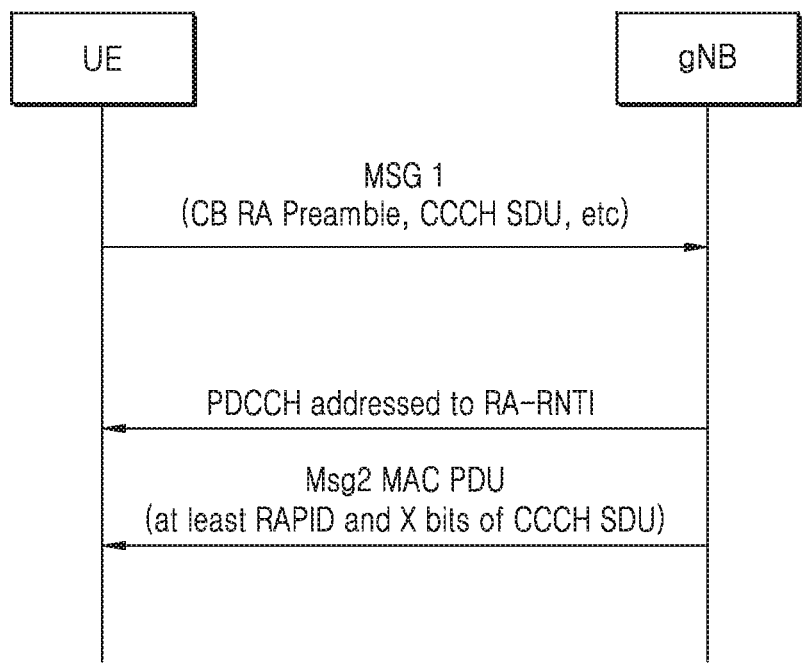
FIG. 7 is a flowchart illustrating another random access procedure in a wireless communication system according to an embodiment of the disclosure.
Figure 8:
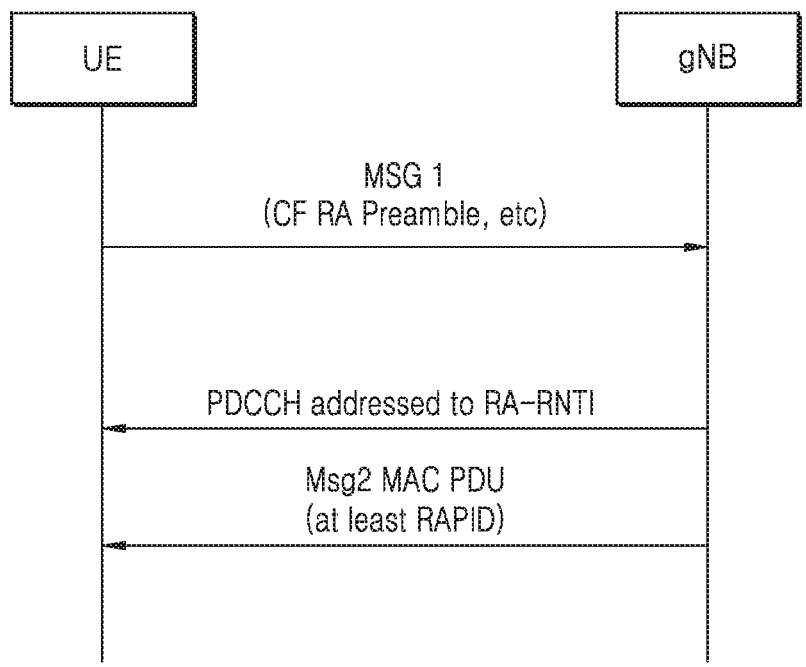
FIG. 8 is a flowchart illustrating another random access procedure in a wireless communication system according to an embodiment of the disclosure.

FIGS. 6, 7 and 8 are flowcharts illustrating random access procedures in a wireless communication system according to various embodiments of the disclosure.

For Msg2 reception, UE monitors for PDCCH addressed to RA-RNTI (also referred as Msg2-RNTI or MsgB-RNTI). The RA-RNTI can be a fixed/pre-defined RNTI for 2 step RA or can be derived based on at least the time/frequency location of Msg1 occasion in which Msg1 is transmitted. Msg1 occasion can be the PRACH occasion in which random access preamble part of Msg1 is transmitted. Msg1 occasion can be the PUSCH occasion in which payload/MAC PDU part of Msg1 is transmitted. In an embodiment of the disclosure, upon receiving Msg1 successfully, for Msg2 gNB may transmits a PDCCH addressed to RA-RNTI. The Transport Block (TB) scheduled by PDCCH addressed to RA-RNTI may include a MAC PDU. The RAPID corresponding to random access preamble transmitted in Msg1 may be included in MAC PDU. The detailed MAC PDU format and other information included in MAC PDU are discussed later.

In an embodiment of the disclosure, the 2 step RA procedure is considered successfully completed by UE based on the following operation:

Embodiment 1-1 (The Signaling Flow Between UE and gNB for Embodiment 1-1 is Shown in FIG. 6)

When the random access preamble transmitted in Msg1 was selected from contention based random access preambles and when UE has included (or transmitted) C-RNTI in Msg1 (i.e., in payload/MAC PDU part of Msg1), 2 step RA procedure is successfully completed when all of the following conditions are met:
  UE receives PDCCH addressed to RA-RNTI and received TB (scheduled by this PDCCH) is successfully decoded; and
  MAC PDU (in the received TB) includes Random Access Preamble identifier (RAPID) corresponding to the transmitted random access preamble; and
  MAC PDU (in the received TB) includes C-RNTI that matches the C-RNTI transmitted in Msg1.

In the embodiment of the disclosure, upon receiving the Msg1 successfully, Msg2 MAC PDU transmitted by gNB may include RAPID, TA, C-RNTI and UL grant. In an embodiment of the disclosure, UL grant may not be included. In an embodiment of the disclosure, TA may not be included. In an embodiment both TA and UL grant may not be included. The above information may be included in a MAC subPDU of Msg2 MAC PDU.

Embodiment 1-2 (The Signaling Flow Between UE and gNB is Shown in FIG. 7)

When the random access preamble transmitted in Msg1 was selected from contention based random access preambles and when UE has included (or transmitted) CCCH SDU in Msg1 (i.e., in payload/MAC PDU part of Msg1), 2 step RA procedure is successfully completed when all of the following conditions are met:
  UE receives PDCCH addressed to RA-RNTI and received TB (scheduled by this PDCCH) is successfully decoded; and
  MAC PDU (in the received TB) includes Random Access Preamble identifier (RAPID) corresponding to the transmitted random access preamble; and
  MAC PDU (in the received TB) includes contention resolution identity that matches the first X bits of CCCH SDU transmitted in Msg1. X is pre-defined. In an example it can be 48 bits.

In the embodiment of the disclosure, upon receiving the Msg1 successfully, Msg2 MAC PDU transmitted by gNB may include RAPID, Contention Resolution Identity, TA, C-RNTI and UL grant. In an embodiment of the disclosure, UL grant may not be included. The above information may be included in a MAC subPDU of Msg2 MAC PDU. Upon successful completion of 2 step RA procedure, UE applies the received C-RNTI for UE specific PDCCH reception.

Embodiment 1-3 (The Signaling Flow Between UE and gNB is Shown in FIG. 8)

When UE has transmitted contention free preamble in Msg1, 2 step RA procedure is successfully completed when all of the following conditions are met:
  UE receives PDCCH addressed to RA-RNTI and received TB (scheduled by this PDCCH) is successfully decoded; and
  MAC PDU (in the received TB) includes Random Access Preamble identifier corresponding to the transmitted random access preamble;

In the embodiment of the disclosure, upon receiving the Msg1 successfully, Msg2 MAC PDU transmitted by gNB may include at least RAPID. In an embodiment of the disclosure, TA can also be included. In an embodiment of the disclosure, UL grant can also be included. The above information may be included in a MAC subPDU of Msg2 MAC PDU.

It is to be noted that the above procedures only explain the procedure for the embodiments complete Msg1 (i.e. both preamble and payload part of Msg1) is successfully received by gNB. It is also possible that gNB only receives the random access preamble and PUSCH part of Msg1 is not received successfully. In this embodiment of the disclosure, gNB can provide fallback information (i.e. RAPID, TA, TC-RNTI and UL Grant) which is explained later.

Embodiment 2

Figure 9:
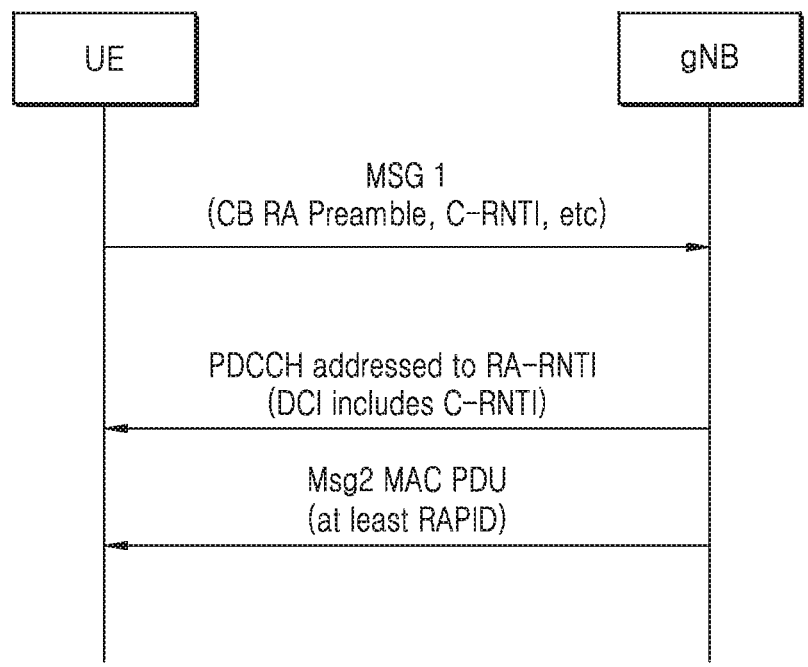
FIG. 9 is a flowchart illustrating another random access procedure in a wireless communication system according to an embodiment of the disclosure.
Figure 10:
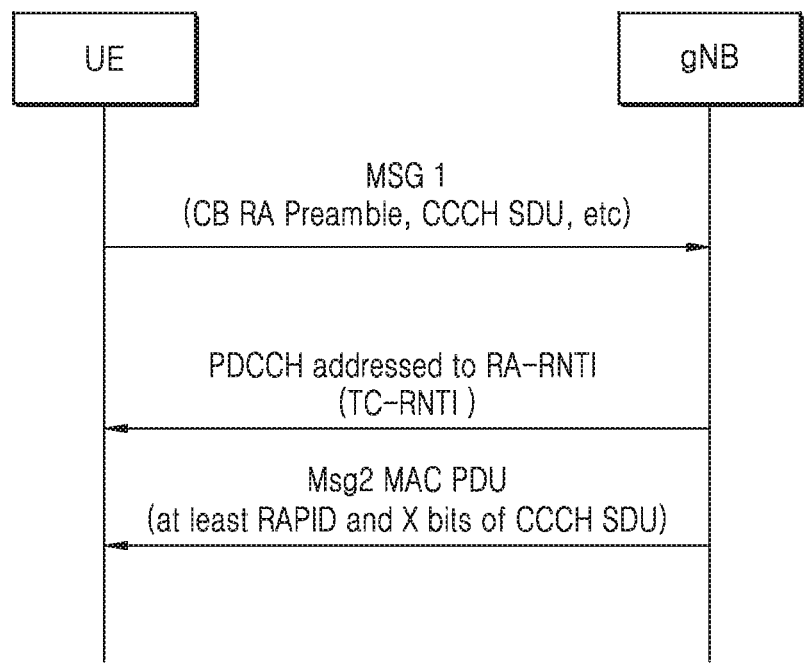
FIG. 10 is a flowchart illustrating another random access procedure in a wireless communication system according to an embodiment of the disclosure.

FIGS. 9 and 10 are flowcharts illustrating random access procedures in a wireless communication system according to various embodiments of the disclosure.

For Msg2 reception, UE monitors for PDCCH addressed to RA-RNTI (also referred as Msg2-RNTI or MsgB-RNTI).

The RA-RNTI can be a fixed/pre-defined RNTI for 2 step RA or can be derived based on at least the time/frequency location of Msg1 occasion in which Msg1 is transmitted. Msg1 occasion can be the PRACH occasion in which random access preamble part of Msg1 is transmitted. Msg1 occasion can be the PUSCH occasion in which payload/MAC PDU part of Msg1 is transmitted. In an embodiment of the disclosure, upon receiving Msg1 successfully, for Msg2 gNB may transmits a PDCCH addressed to RA-RNTI. The TB scheduled by PDCCH addressed to RA-RNTI may include a MAC PDU. The RAPID corresponding to random access preamble transmitted in Msg1 may be included in MAC PDU. The detailed MAC PDU format and other information included in MAC PDU are discussed later.

In an embodiment of the disclosure, the DCI in PDCCH addressed to RA-RNTI includes RNTI field. It is set to TC-RNTI by gNB when CCCH SDU was included in Msg1. It is set to C-RNTI by gNB when C-RNTI was included in Msg1. When CF preambles is transmitted in Msg1, RNTI field in DCI can be left empty or set to C-RNTI.

In an embodiment of the disclosure, the 2 step RA procedure is considered successfully completed based on the following operation:

Embodiment 2-1 (The Signaling Flow Between UE and gNB for Embodiment 2-1 is Shown in FIG. 9)

When the random access preamble transmitted in Msg1 was selected from contention based random access preambles and when UE has included (or transmitted) C-RNTI in Msg1 (i.e. payload/MAC PDU part of Msg1), 2 step RA procedure is successfully completed when all of the following conditions are met:
  UE receives PDCCH addressed to RA-RNTI and DCI (in the received PDCCH) includes the C-RNTI that matches the C-RNTI transmitted in Msg1 and received TB (scheduled by the received PDCCH) is successfully decoded; and
  MAC PDU (in the received TB) includes Random Access Preamble identifier (RAPID) corresponding to the transmitted random access preamble;

In the embodiment of the disclosure, upon receiving the Msg1 successfully, Msg2 MAC PDU transmitted by gNB may include RAPID, TA and UL grant. In an embodiment of the disclosure, UL grant is not included. In an embodiment of the disclosure, TA may not be included. In an embodiment of the disclosure, both TA and UL grant may not be included. The above information may be included in a MAC subPDU of Msg2 MAC PDU.

Embodiment 2-2 (The Signaling Flow Between UE and gNB is Shown in FIG. 10)

When the random access preamble transmitted in Msg1 was selected from contention based random access preambles and when UE has included (or transmitted) CCCH SDU in Msg1 (i.e. payload/MAC PDU part of Msg1), 2 step RA procedure is successfully completed when all of the following conditions are met:
  UE receives PDCCH addressed to RA-RNTI and received TB (scheduled by this PDCCH) is successfully decoded; and
  MAC PDU (in the received TB) includes Random Access Preamble identifier (RAPID) corresponding to the transmitted random access preamble; and MAC PDU (in the received TB) includes contention resolution identity that matches the first X bits of CCCH SDU transmitted in Msg1. X is pre-defined. In an example it can be 48 bits.

In the embodiment of the disclosure, upon receiving the Msg1 successfully, Msg2 MAC PDU transmitted by gNB may include RAPID, Contention Resolution Identity, TA and UL grant. In an embodiment of the disclosure, UL grant is not included. The above information may be included in a MAC subPDU of Msg2 MAC PDU. Upon successful completion of 2 step RA procedure, UE applies the C-RNTI (or TC-RNTI) received in PDCCH for UE specific PDCCH reception.

Embodiment 2-3 (The Signaling Flow Between UE and gNB is Shown in FIG. 8)

When UE has transmitted contention free preamble in Msg1, 2 step RA procedure is successfully completed when all of the following conditions are met:
  UE receives PDCCH addressed to RA-RNTI and received TB (scheduled by this PDCCH) is successfully decoded; and
  MAC PDU (in the received TB) includes Random Access Preamble identifier (RAPID) corresponding to the transmitted random access preamble;

In the embodiment of the disclosure, upon receiving the Msg1 successfully, Msg2 MAC PDU transmitted by gNB may include at least RAPID. In an embodiment of the disclosure, TA can also be included. In an embodiment of the disclosure, UL grant can also be included. The above information may be included in a MAC subPDU of Msg2 MAC PDU.

It is to be noted that the above procedure only explains the procedure for the case complete Msg1 (i.e. both preamble and payload part of Msg1) is successfully received by gNB. It is also possible that gNB only receives the random access preamble and PUSCH part of Msg1 is not received successfully. In this case gNB can provide fallback information (i.e. RAPID, TA, TC-RNTI and UL Grant) which is explained later.

Embodiment 3

Figure 11:
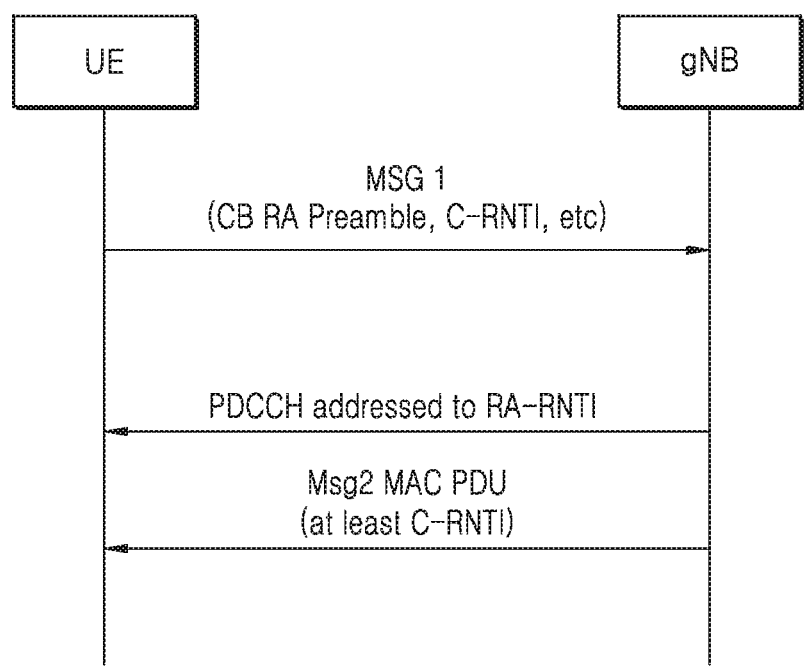
FIG. 11 is a flowchart illustrating another random access procedure in a wireless communication system according to an embodiment of the disclosure.
Figure 12:
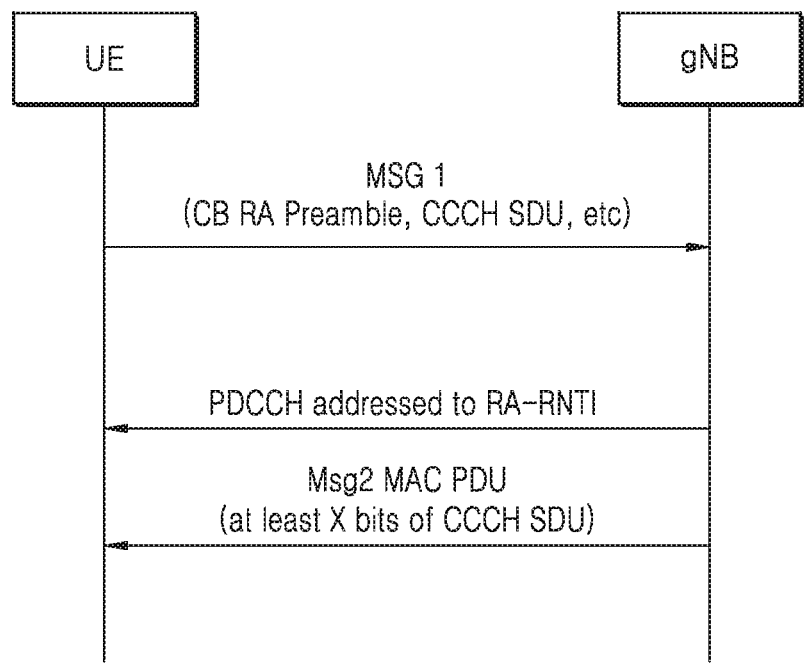
FIG. 12 is a flowchart illustrating another random access procedure in a wireless communication system according to an embodiment of the disclosure.
Figure 13:
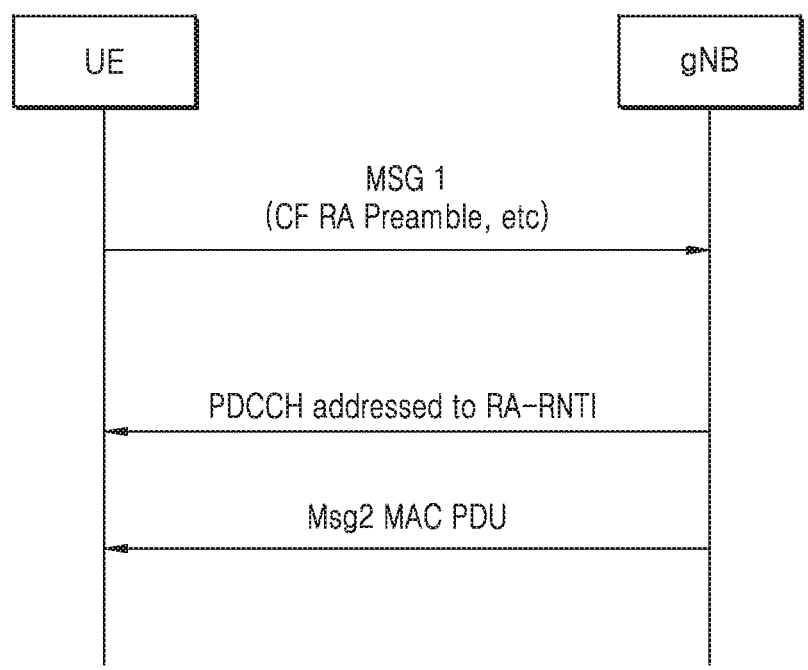
FIG. 13 is a flowchart illustrating another random access procedure in a wireless communication system according to an embodiment of the disclosure.

FIGS. 11, 12 and 13 are flowcharts illustrating random access procedures in a wireless communication system according to various embodiments of the disclosure.

For Msg2 reception, UE monitors PDCCH addressed to RA-RNTI (also referred as Msg2-RNTI or MsgB-RNTI). The RA-RNTI can be a fixed/pre-defined RNTI for 2 step RA. In an embodiment of the disclosure, when preamble is not transmitted in Msg1 the RA-RNTI may be derived based on at least the time/frequency location of Msg1 occasion in which Msg1 is transmitted or when preamble is transmitted in Msg1 RA-RNTI can be derived based on at least the time/frequency location of Msg1 occasion in which Msg1 is transmitted and RAPID or RA-RNTI can be derived based on at least the time/frequency location of Msg1 occasion in which Msg1 is transmitted irrespective of preamble is transmitted in Msg1 or not. Msg1 occasion can be the PRACH occasion in which random access preamble part of Msg1 is transmitted. Msg1 occasion can be the PUSCH occasion in which payload/MAC PDU part of Msg1 is transmitted. In an embodiment of the disclosure, upon receiving Msg1, for Msg2 gNB may transmits a PDCCH addressed to RA-RNTI. The TB scheduled by PDCCH addressed to RA-RNTI may include a MAC PDU. RAPID may not be included in the MAC PDU. The detailed MAC PDU format and other information included in MAC PDU are discussed later.

In an embodiment of the disclosure, the 2 step RA procedure is considered successfully completed based on the following operation:

Embodiment 3-1 (The Signaling Flow Between UE and gNB for Embodiment 3-1 is Shown in FIG. 11)

When the random access preamble transmitted in Msg1 was selected from contention based random access preambles and when UE has included (or transmitted) C-RNTI in Msg1 (i.e in payload/MAC PDU part of Msg1), 2 step RA procedure is successfully completed when all of the following conditions are met:
UE receives PDCCH addressed to RA-RNTI and received TB (scheduled by this PDCCH) is successfully decoded; and
MAC PDU (in the received TB) includes C-RNTI that matches the C-RNTI transmitted in Msg1.

Embodiment 3-1a (Preamble is Not Transmitted in Msg1): when UE has Included (or Transmitted) C-RNTI in Msg1 (i.e., in Payload/MAC PDU Part of Msg1), 2 Step RA Procedure is Successfully Completed when All of the Following Conditions are Met UE receives PDCCH addressed to RA-RNTI and received TB (scheduled by this PDCCH) is successfully decoded; and
MAC PDU (in the received TB) includes C-RNTI that matches the C-RNTI transmitted in Msg1.

In the embodiment 3-1 and 3-1a, upon receiving the Msg1 successfully, Msg2 MAC PDU transmitted by gNB may include TA, C-RNTI and UL grant. In an embodiment of the disclosure, UL grant may not be included. In an embodiment of the disclosure, TA may not be included. In an embodiment both TA and UL grant may not be included. The above information is included in a MAC subPDU of Msg2 MAC PDU.

Embodiment 3-2 (The Signaling Flow Between UE and gNB is Shown in FIG. 12)

When the random access preamble transmitted in Msg1 was selected from contention based random access preambles and when UE has included (or transmitted) CCCH SDU in Msg1 (i.e., in payload/MAC PDU part of Msg1), 2 step RA procedure is successfully completed when all of the following conditions are met:
UE receives PDCCH addressed to RA-RNTI and received TB (scheduled by this PDCCH) is successfully decoded; and
MAC PDU (in received TB) includes contention resolution identity that matches the first X bits of CCCH SDU transmitted in Msg1. X is pre-defined. In an example it can be 48 bits.

Embodiment 3-2a (No Preamble Transmission in Msg1)

when UE has included (or transmitted) CCCH SDU in Msg1 (i.e., in payload/MAC PDU part of Msg1), 2 step RA procedure is successfully completed when all of the following conditions are met:
UE receives PDCCH addressed to RA-RNTI and received TB (scheduled by this PDCCH) is successfully decoded; and
MAC PDU (in received TB) includes contention resolution identity that matches the first X bits of CCCH SDU transmitted in Msg1. X is pre-defined. In an example it can be 48 bits.

In the embodiment 3-2 and 3-2a, upon receiving the Msg1 successfully, Msg2 MAC PDU transmitted by gNB may include Contention Resolution Identity, C-RNTI, TA and UL grant. In an embodiment of the disclosure, UL grant may not be included. The above information may be included in a MAC subPDU of Msg2 MAC PDU. Upon successful completion of 2 step RA procedure, UE applies the received C-RNTI (or TC-RNTI) for UE specific PDCCH reception.

Embodiment 3-3 (The Signaling Flow Between UE and gNB is Shown in FIG. 13)

When UE has transmitted contention free preamble in Msg1, 2 step RA procedure is successfully completed when all of the following condition is met:
(Alternate 1: when RAPID is included in RA-RNTI) UE receives PDCCH addressed to RA-RNTI;
(Alternate 2: when RAPID is not included in RA-RNTI) UE receives PDCCH addressed to RA-RNTI and received TB (scheduled by this PDCCH) is successfully decoded; and MAC PDU (in the received TB) includes C-RNTI that matches the C-RNTI transmitted in Msg1.

In the embodiment of the disclosure, upon receiving the Msg1 successfully, Msg2 MAC PDU transmitted by gNB can include C-RNTI. In an embodiment of the disclosure, TA can also be included. In an embodiment of the disclosure, UL grant can also be included. The above information is included in a MAC subPDU of Msg2 MAC PDU.

It is to be noted that the above procedure only explains the procedure for the case complete Msg1 (i.e. both preamble and payload part of Msg1) is successfully received by gNB. It is also possible that gNB only receives the random access preamble and PUSCH part of Msg1 is not received successfully. In this case gNB can provide fallback information (i.e. RAPID, TA, TC-RNTI and UL Grant) which is explained later.

Embodiment 3A

Figure 14:
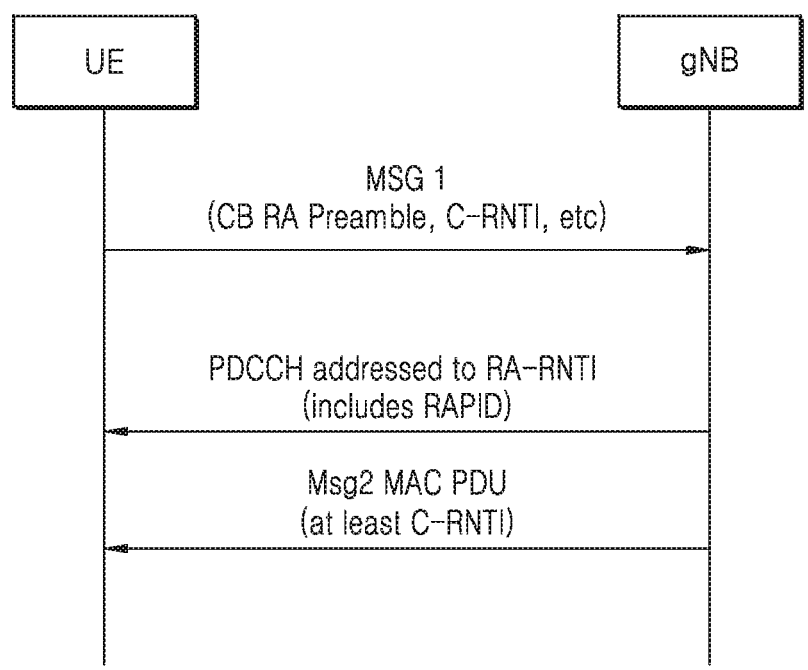
FIG. 14 is a flowchart illustrating another random access procedure in a wireless communication system according to an embodiment of the disclosure.
Figure 15:
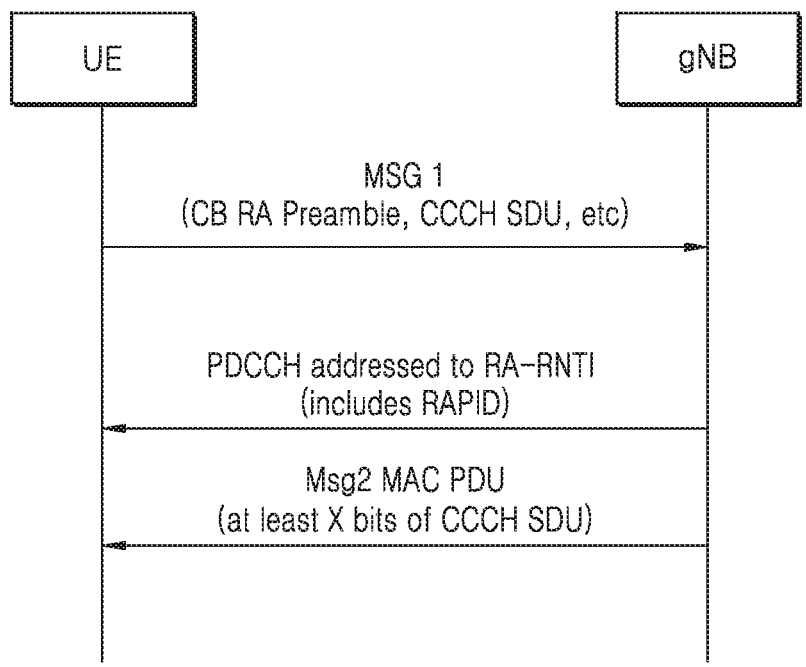
FIG. 15 is a flowchart illustrating another random access procedure in a wireless communication system according to an embodiment of the disclosure.
Figure 16:
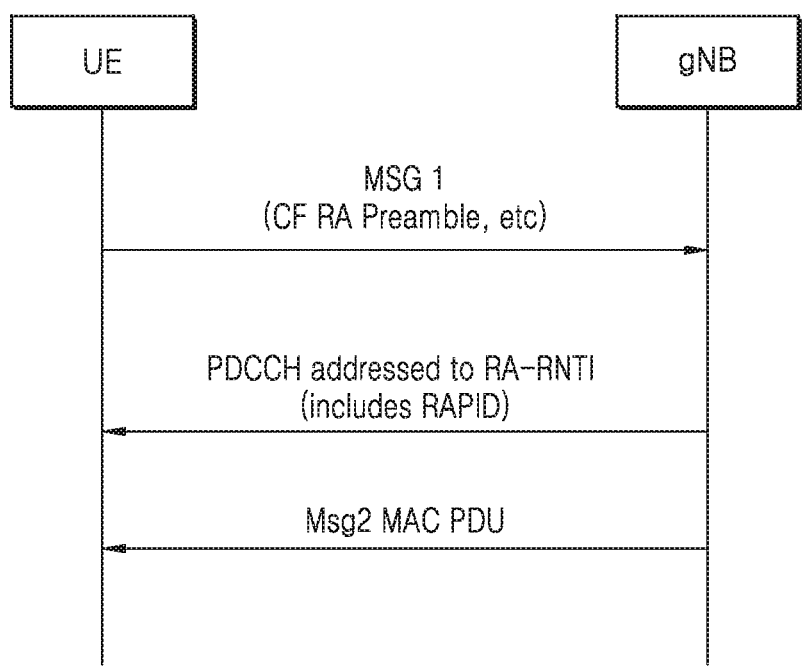
FIG. 16 is a flowchart illustrating another random access procedure in a wireless communication system according to an embodiment of the disclosure.

FIGS. 14, 15 and 16 are flowcharts illustrating random access procedures in a wireless communication system according to various embodiments of the disclosure.

For Msg2 reception, UE monitors for PDCCH addressed to RA-RNTI. The RA-RNTI can be a fixed/pre-defined RNTI for 2 step RA. In an embodiment of the disclosure, the RA-RNTI may be derived based on at least the time/frequency location of Msg1 occasion in which Msg1 is transmitted. Msg1 occasion can be the PRACH occasion in which random access preamble part of Msg1 is transmitted. Msg1 occasion can be the PUSCH occasion in which payload/MAC PDU part of Msg1 is transmitted. In an embodiment of the disclosure, upon receiving Msg1 successfully, for Msg2 gNB may transmit a PDCCH addressed to RA-RNTI. The TB scheduled by PDCCH addressed to RA-RNTI may include a MAC PDU. RAPID may be included in the DCI of PDCCH addressed to RA-RNTI. RAPID may not be included in the MAC PDU. The detailed MAC PDU format and other information included in MAC PDU are discussed later.

In an embodiment of the disclosure, the 2 step RA procedure is considered successfully completed based on the following operation:

Embodiment 3A-1 (The Signaling Flow Between UE and gNB for Embodiment 3A-1 is Shown in FIG. 14)

When the random access preamble transmitted in Msg1 was selected from contention based random access preambles and when UE has included (or transmitted) C-RNTI in Msg1 (i.e., in payload/MAC PDU part of Msg1), 2 step RA procedure is successfully completed when all of the following conditions are met:
  UE receives PDCCH addressed to RA-RNTI and DCI includes Random Access Preamble identifier corresponding to the transmitted random access preamble and received TB (scheduled by this PDCCH) is successfully decoded; and
  MAC PDU (in received TB) includes C-RNTI that matches the C-RNTI transmitted in Msg1.

In the embodiment of the disclosure, upon receiving the Msg1 successfully, Msg2 MAC PDU transmitted by gNB may include TA, C-RNTI and UL grant. In an embodiment of the disclosure, UL grant may not be included. In an embodiment of the disclosure, TA may not be included. In an embodiment both TA and UL grant may not be included. The above information may be included in a MAC subPDU of Msg2 MAC PDU.

Embodiment 3A-2 (The Signaling Flow Between UE and gNB is Shown in FIG. 15)

When the random access preamble transmitted in Msg1 was selected from contention based random access preambles and when UE has included (or transmitted) CCCH SDU in Msg1 (i.e. payload/MAC PDU part of Msg1), 2 step RA procedure is successfully completed when all of the following conditions are met:
  UE receives PDCCH addressed to RA-RNTI and DCI includes Random Access Preamble identifier corresponding to the transmitted random access preamble and received TB (scheduled by this PDCCH) is successfully decoded; and
  MAC PDU (in received TB) includes contention resolution identity that matches the first X bits of CCCH SDU transmitted in Msg1. X is pre-defined. In an example, X can be 48 bits.

In the embodiment of the disclosure, upon receiving the Msg1 successfully, Msg2 MAC PDU transmitted by gNB may include Contention Resolution Identity, C-RNTI, TA and UL grant. In an embodiment of the disclosure, UL grant may not be included. The above information may be included in a MAC subPDU of Msg2 MAC PDU. Upon successful completion of 2 step RA procedure, UE applies the received C-RNTI (or TC-RNTI) for UE specific PDCCH reception.

Embodiment 3A-3 (The Signaling Flow Between UE and gNB is Shown in FIG. 16)

When UE has transmitted contention free preamble in Msg1, 2 step RA procedure is successfully completed when all of the following conditions are met:
  UE receives PDCCH addressed to RA-RNTI and DCI includes Random Access Preamble identifier corresponding to the transmitted random access preamble and received TB (scheduled by this PDCCH) is successfully decoded;

In the embodiment of the disclosure, upon receiving the Msg1 successfully, Msg2 MAC PDU transmitted by gNB can include C-RNTI. In an embodiment of the disclosure, TA can also be included. In an embodiment of the disclosure, UL grant can also be included. The above information may be included in a MAC subPDU of Msg2 MAC PDU.

It is to be noted that the above procedure only explains the procedure for the case complete Msg1 (i.e. both preamble and payload part of Msg1) is successfully received by gNB. It is also possible that gNB only receives the random access preamble and PUSCH part of Msg1 is not received successfully. In this case gNB can provide fallback information (i.e. RAPID, TA, TC-RNTI and UL Grant) which is explained later.

Embodiment 4

Figure 17:
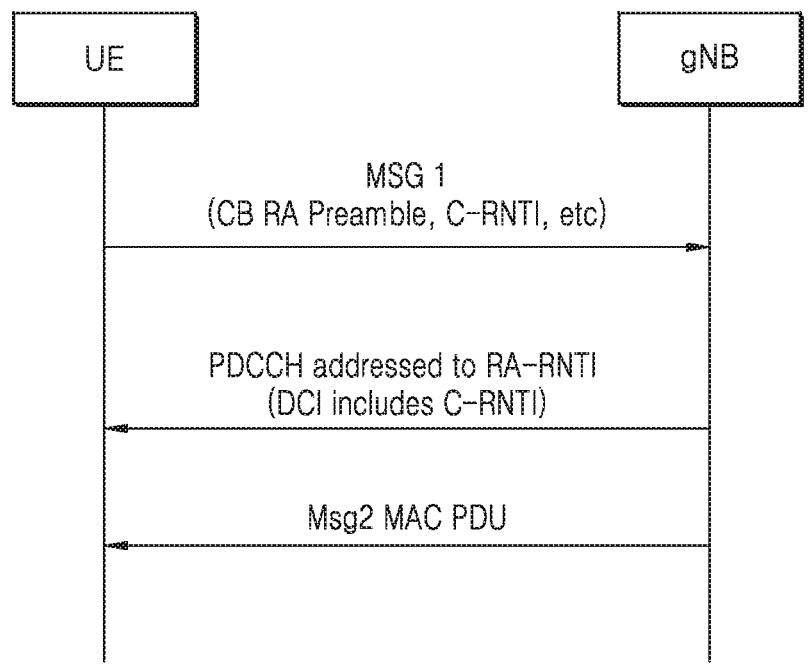
FIG. 17 is a flowchart illustrating another random access procedure in a wireless communication system according to an embodiment of the disclosure.
Figure 18:
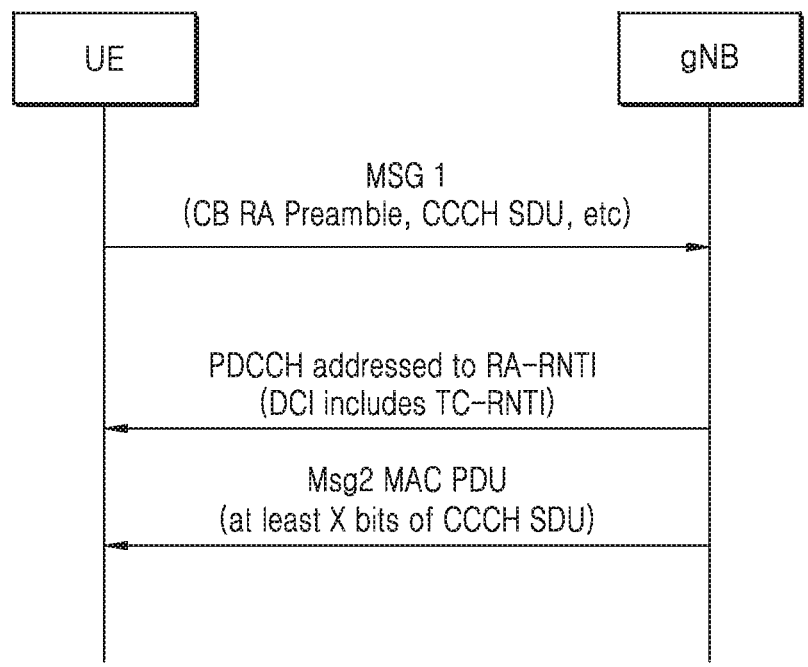
FIG. 18 is a flowchart illustrating another random access procedure in a wireless communication system according to an embodiment of the disclosure.

FIGS. 17 and 18 are flowcharts illustrating random access procedures in a wireless communication system according to various embodiments of the disclosure.

For Msg2 reception, UE monitors PDCCH addressed to RA-RNTI. The RA-RNTI can be a fixed/pre-defined RNTI for 2 step RA. In an embodiment of the disclosure, when preamble is not transmitted in Msg1 the RA-RNTI may be derived based on at least the time/frequency location of Msg1 occasion in which Msg1 is transmitted or when preamble is transmitted in Msg1 RA-RNTI can be derived based on at least the time/frequency location of Msg1 occasion in which Msg1 is transmitted and RAPID or RA-RNTI can be derived based on at least the time/frequency location of Msg1 occasion in which Msg1 is transmitted irrespective of whether preamble is transmitted in Msg1 or not. Msg1 occasion can be the PRACH occasion in which random access preamble part of Msg1 is transmitted. Msg1 occasion can be the PUSCH occasion in which payload/MAC PDU part of Msg1 is transmitted.

In the embodiment of the disclosure, upon receiving Msg1 successfully, for Msg2 gNB may transmit a PDCCH addressed to RA-RNTI. The TB scheduled by PDCCH addressed to RA-RNTI may include a MAC PDU. RAPID may not be included in MAC PDU. The detailed MAC PDU format and other information may be included in MAC PDU are discussed later.

In the embodiment of the disclosure, the DCI in PDCCH addressed to RA-RNTI may include RNTI field. It is set to TC-RNTI by gNB when CCCH SDU was included in Msg1. It is set to C-RNTI by gNB when C-RNTI was included in Msg1. When CF preambles are transmitted in Msg1, RNTI field in DCI can be left empty or set to C-RNTI.

In an embodiment of the disclosure, the 2 step RA procedure is considered successfully completed based on the following operation:

Embodiment 4-1 (The Signaling Flow Between UE and gNB for Embodiment 4-1 is Shown in FIG. 17)

When the random access preamble transmitted in Msg1 was selected from contention based random access preambles and when UE has included (or transmitted) C-RNTI in Msg1 (i.e. payload/MAC PDU part of Msg1), 2 step RA procedure is successfully completed when all of the following conditions are met:

UE receives PDCCH addressed to RA-RNTI and DCI includes the C-RNTI that matches the C-RNTI transmitted in Msg1;

Embodiment 4-1a (No Preamble Transmission in Msg1)

when UE has included (or transmitted) C-RNTI in Msg1 (i.e. payload/MAC PDU part of Msg1), 2 step RA procedure is successfully completed when all of the following conditions are met:
UE receives PDCCH addressed to RA-RNTI and DCI includes the C-RNTI that matches the C-RNTI transmitted in Msg1;
In the embodiment of the disclosure, upon receiving the Msg1 successfully, Msg2 MAC PDU transmitted by gNB may include TA and UL grant. In an embodiment of the disclosure, UL grant may not be included. In an embodiment of the disclosure, TA may not be included. In an embodiment both TA and UL grant may not be included. The above information may be included in a MAC subPDU of Msg2 MAC PDU.

Embodiment 4-2 (The Signaling Flow Between UE and gNB is Shown in FIG. 18)

When the random access preamble transmitted in Msg1 was selected from contention based random access preambles and when UE has included (or transmitted) CCCH SDU in Msg1 (i.e. payload/MAC PDU part of Msg1), 2 step RA procedure is successfully completed when all of the following conditions are met:
UE receives PDCCH addressed to RA-RNTI and received TB (scheduled by this PDCCH) is successfully decoded; and
MAC PDU (in received TB) includes contention resolution identity that matches the first X bits of CCCH SDU transmitted in Msg1. X is pre-defined. In an example, it can be 48 bits.

Embodiment 4-2a (No Preamble Transmission Case): when UE has Included (or Transmitted) CCCH SDU in Msg1 (i.e. Payload/MAC PDU Part of Msg1), 2 Step RA Procedure is Successfully Completed when all of the Following Conditions are Met UE receives PDCCH addressed to RA-RNTI and received TB (scheduled by this PDCCH) is successfully decoded; and
MAC PDU (in received TB) includes contention resolution identity that matches the first X bits of CCCH SDU transmitted in Msg1. X is pre-defined. In an example, it can be 48 bits.
In the embodiment of the disclosure, upon receiving the Msg1 successfully, Msg2 MAC PDU transmitted by gNB may include Contention Resolution Identity, TA and UL grant. In an embodiment of the disclosure, UL grant may not be included. The above information may be included in a MAC subPDU of Msg2 MAC PDU. Upon successful completion of 2 step RA procedure, UE applies the received C-RNTI (or TC-RNTI) for UE specific PDCCH reception.

Embodiment 4-3 (The Signaling Flow Between UE and gNB is Shown in FIG. 13)

When UE has transmitted contention free preamble in Msg1, 2 step RA procedure is successfully completed when all of the following conditions are met:

UE receives PDCCH addressed to RA-RNTI and DCI includes the C-RNTI that matches the C-RNTI transmitted in Msg1;
It is to be noted that the above procedure only explains the procedure for the case complete Msg1 (i.e. both preamble and payload part of Msg1) is successfully received by gNB. It is also possible that gNB only receives the random access preamble and PUSCH part of Msg1 is not received successfully. In this case gNB can provide fallback information (i.e. RAPID, TA, TC-RNTI and UL Grant) which is explained later.

Embodiment 4A

Figure 19:
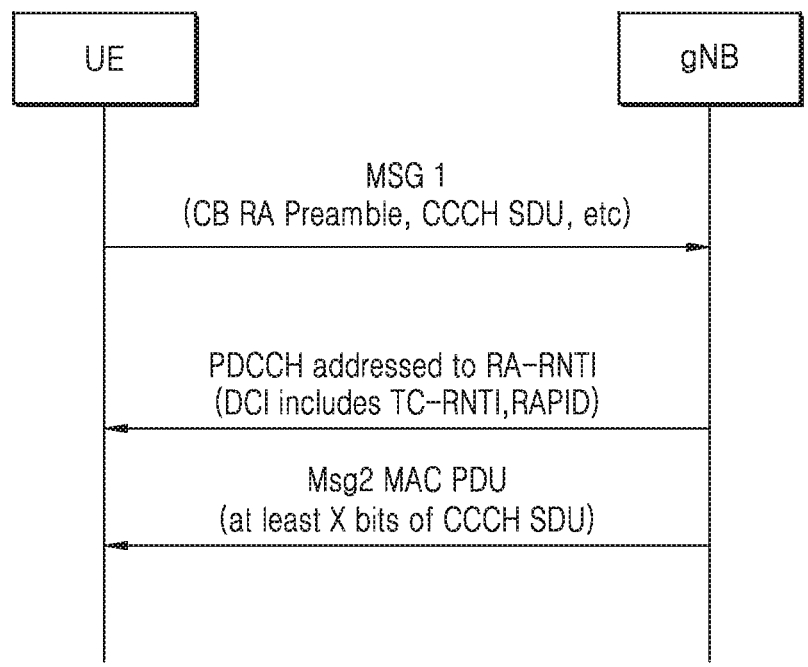
FIG. 19 is a flowchart illustrating another random access procedure in a wireless communication system according to an embodiment of the disclosure.

FIG. 19 is a flowchart illustrating another random access procedure in a wireless communication system according to an embodiment of the disclosure.

UE monitors PDCCH addressed to RA-RNTI. In an embodiment of the disclosure, the RA-RNTI may be derived based on at least the time/frequency location of Msg1 occasion in which Msg1 is transmitted. Msg1 occasion can be the PRACH occasion in which random access preamble part of Msg1 is transmitted. Msg1 occasion can be the PUSCH occasion in which payload/MAC PDU part of Msg1 is transmitted. In an embodiment of the disclosure, upon receiving Msg1, for Msg2, gNB may transmit a PDCCH addressed to RA-RNTI. RAPID may be included in the DCI of PDCCH addressed to RA-RNTI. The TB scheduled by PDCCH addressed to RA-RNTI may include a MAC PDU. RAPID may not be included in the MAC PDU. The detailed MAC PDU format and other information included in MAC PDU are discussed later.

In the embodiment of the disclosure, the DCI in PDCCH addressed to RA-RNTI may include RNTI field. It is set to TC-RNTI by gNB when CCCH SDU was included in Msg1. It is set to C-RNTI by gNB when C-RNTI was included in Msg1. When CF preambles are transmitted in Msg1, RNTI field in DCI can be left empty or set to C-RNTI.

In an embodiment of the disclosure, the 2 step RA procedure is considered successfully completed based on the following operation:

Embodiment 4A-1 (The Signaling Flow Between UE and gNB for Embodiment 4A-1 is Shown in FIG. 14): When the Random Access Preamble Transmitted in Msg1 was Selected from Contention Based Random Access Preambles and when UE has Included (or Transmitted) C-RNTI in Msg1 (i.e. Payload/MAC PDU Part of Msg1), 2 Step RA Procedure is Successfully Completed when All of the Following Conditions are Met UE receives PDCCH addressed to RA-RNTI and DCI includes the C-RNTI that matches the C-RNTI transmitted in Msg1 and received TB (scheduled by this PDCCH) is successfully decoded;
In the embodiment of the disclosure, upon receiving the Msg1 successfully, Msg2 MAC PDU transmitted by gNB may include TA and UL grant. In an embodiment of the disclosure, UL grant may not be included. In an embodiment of the disclosure, TA may not be included. In an embodiment both TA and UL grant may not be included. The above information may be included in a MAC subPDU of Msg2 MAC PDU.

Embodiment 4A-2 (The Signaling Flow Between UE and gNB is Shown in FIG. 19)

When the random access preamble transmitted in Msg1 was selected from contention based random access preambles and when UE has included (or transmitted) CCCH SDU in Msg1 (i.e. payload/MAC PDU part of Msg1), 2 step RA procedure is successfully completed when all of the following conditions are met:

UE receives PDCCH addressed to RA-RNTI and DCI includes Random Access Preamble identifier corresponding to the transmitted random access preamble and received TB (scheduled by this PDCCH) is successfully decoded; and MAC PDU (in received TB) includes contention resolution identity that matches the first X bits of CCCH SDU transmitted in Msg1. X is pre-defined. In an example, X can be 48 bits.

In the embodiment of the disclosure, upon receiving the Msg1 successfully, Msg2 MAC PDU transmitted by gNB may include Contention Resolution Identity, TA and UL grant. In an embodiment of the disclosure, UL grant may not be included. The above information may be included in a MAC subPDU of Msg2 MAC PDU. Upon successful completion of 2 step RA procedure, UE applies the received C-RNTI (or TC-RNTI) for UE specific PDCCH reception.

Embodiment 4A-3 (The Signaling Flow Between UE and gNB is Shown in FIG. 13)

When UE has transmitted contention free preamble in Msg1, 2 step RA procedure is successfully completed if:

UE receives PDCCH addressed to RA-RNTI and DCI includes Random Access Preamble identifier corresponding to the transmitted random access preamble

OR

UE receives PDCCH addressed to RA-RNTI and DCI includes UE's C-RNTI

It is to be noted that the above procedure only explains the procedure for the case complete Msg1 (i.e. both preamble and payload part of Msg1) is successfully received by gNB. It is also possible that gNB only receives the random access preamble and PUSCH part of Msg1 is not received successfully. In this case gNB can provide fallback information (i.e. RAPID, TA, TC-RNTI and UL Grant) which is explained later.

Embodiment 5

Figure 20:
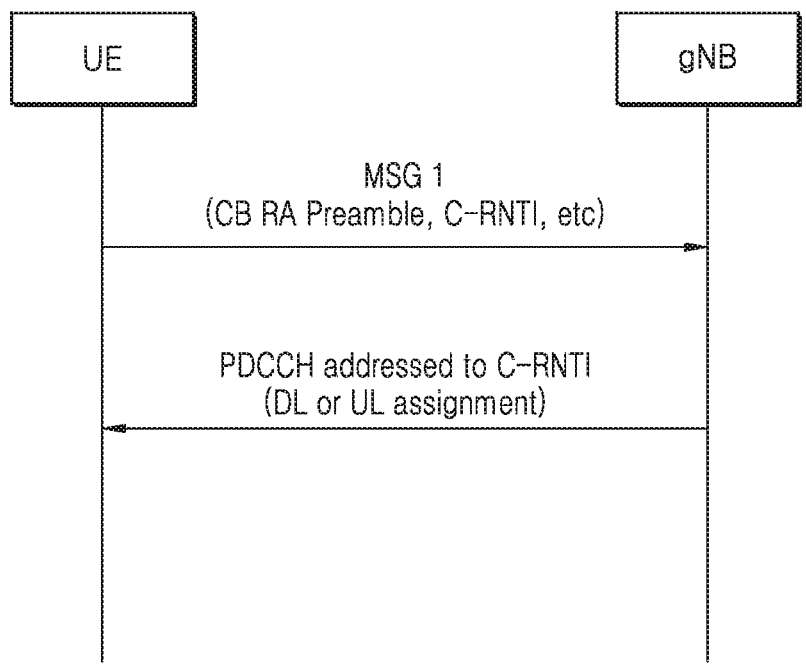
FIG. 20 is a flowchart illustrating another random access procedure in a wireless communication system according to an embodiment of the disclosure.
Figure 21:
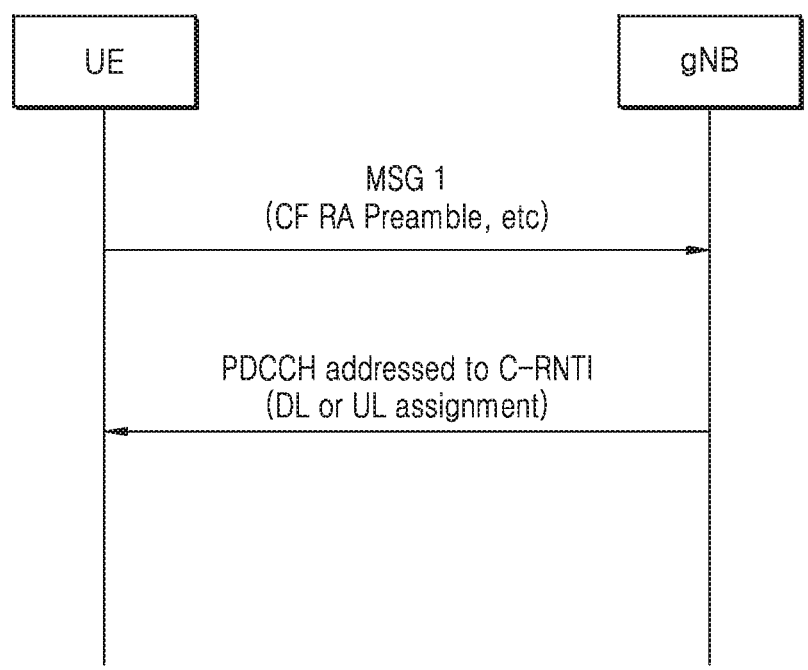
FIG. 21 is a flowchart illustrating another random access procedure in a wireless communication system according to an embodiment of the disclosure.

FIGS. 20 and 21 are flowcharts illustrating random access procedures in a wireless communication system according to various embodiments of the disclosure.

For Msg2 reception, UE monitors for PDCCH addressed to C-RNTI, when it has transmitted C-RNTI in Msg1 (i.e. in payload/MAC PDU of Msg1) or when contention free random access preamble was transmitted in Msg1. It is to be noted that when fallback operation (as explained later) is supported, UE also monitors for PDCCH addressed to RA-RNTI in addition to C-RNTI when it has transmitted C-RNTI in Msg1 (i.e. in payload/MAC PDU of Msg1). UE monitors for PDCCH addressed to RA-RNTI when it has transmitted CCCH SDU in Msg1. The RA-RNTI can be a fixed/pre-defined RNTI for 2 step RA or can be derived based on at least the time/frequency location of Msg1 occasion in which Msg1 is transmitted. Msg1 occasion can be the PRACH occasion in which random access preamble part of Msg1 is transmitted. Msg1 occasion can be the PUSCH occasion in which payload/MAC PDU part of Msg1 is transmitted.

In an embodiment of the disclosure, upon receiving Msg1 successfully, for Msg2 gNB may transmit a PDCCH addressed to RA-RNTI when CCCH SDU was received in Msg1. The TB scheduled by PDCCH addressed to RA-RNTI may include a MAC PDU. The RAPID corresponding to random access preamble transmitted in Msg1 may be included in MAC PDU. The detailed MAC PDU format and other information may be included in MAC PDU are discussed later.

In an embodiment of the disclosure, for Msg2 corresponding to successfully received Msg1, gNB may transmit a PDCCH addressed to C-RNTI when C-RNTI was received in Msg1 or when contention free random access preamble was received in Msg1. In case contention free random access preamble was received, gNB can identify the UE based on received contention free preamble as contention free preamble is assigned by gNB to UE.

In an embodiment of the disclosure, the 2 step RA procedure is considered successfully completed by UE based on the following operation:

Embodiment 5-1 (The Signaling Flow Between UE and gNB for Embodiment 5-1 is Shown in FIG. 20)

When the random access preamble transmitted in Msg1 was selected from contention based random access preambles and when UE has included (or transmitted) C-RNTI in Msg1 (i.e. in payload/MAC PDU of Msg1), 2 step RA procedure is successfully completed if:

UE receives PDCCH addressed to C-RNTI that matches the C-RNTI transmitted in Msg1;

The PDCCH may include UL assignment or DL assignment (alternate 1) UE receives PDCCH addressed to C-RNTI that matches the C-RNTI transmitted in Msg1 and received PDCCH includes UL grant for new transmission;

Embodiment 5-2 (The Signaling Flow Between UE and gNB is Shown in FIG. 7)

When the random access preamble transmitted in Msg1 was selected from contention based random access preambles and when UE has included (or transmitted) CCCH SDU in Msg1 (i.e. in payload/MAC PDU of Msg1), 2 step RA procedure is successfully completed when all of the following conditions are met:

UE receives PDCCH addressed to RA-RNTI and received TB (scheduled by this PDCCH) is successfully decoded; and MAC PDU (in the received TB) includes Random Access Preamble identifier corresponding to the transmitted random access preamble; and MAC PDU (in the received TB) includes contention resolution identity that matches the first X bits of CCCH SDU transmitted in Msg1. X is pre-defined. In an example, X can be 48 bits.

In the embodiment of the disclosure, upon receiving the Msg1 successfully, Msg2 MAC PDU transmitted by gNB may include RAPID, Contention Resolution Identity, C-RNTI, TA and UL grant. In an embodiment of the disclosure, UL grant may not be included. The above information may be included in a MAC subPDU of Msg2 MAC PDU. Upon successful completion of 2 step RA procedure, UE applies the received C-RNTI (or TC-RNTI) for UE specific PDCCH reception.

Embodiment 5-3 (The Signaling Flow Between UE and gNB is Shown in FIG. 12)

When UE has transmitted contention free preamble in Msg1, 2 step RA procedure is successfully completed when all of the following conditions are met:
UE receives PDCCH addressed to its C-RNTI
(alternate 1) UE receives PDCCH addressed to C-RNTI and received PDCCH includes UL grant for new transmission;
It is to be noted that the above procedure only explains the procedure for the case complete Msg1 (i.e. both preamble and payload part of Msg1) is successfully received by gNB. It is also possible that gNB only receives the random access preamble and PUSCH part of Msg1 is not received successfully. In this case gNB can provide fallback information (i.e. RAPID, TA, TC-RNTI and UL Grant) in MsgB which is explained later.

Embodiment 6

UE monitors for PDCCH addressed to C-RNTI, when it has transmitted C-RNTI in Msg1 (i.e., in payload/MAC PDU part of Msg1) or when contention free random access preamble was transmitted in Msg1. It is to be noted that when fallback operation (as explained later) is supported, UE also monitors for PDCCH addressed to RA-RNTI in addition to C-RNTI when it has transmitted C-RNTI in Msg1 (i.e., in payload/MAC PDU part of Msg1). UE monitors for PDCCH addressed to RA-RNTI when it has transmitted CCCH SDU in Msg1.

In an embodiment of the disclosure, for Msg2, gNB may transmit a PDCCH addressed to RA-RNTI when CCCH SDU was received in Msg1. In an embodiment of the disclosure, the RA-RNTI may be derived based on at least the time/frequency location of Msg1 occasion in which Msg1 is transmitted when preamble is not transmitted in Msg1 or can be derived based on at least the time/frequency location of Msg1 occasion in which Msg1 is transmitted and RAPID when preamble is transmitted in Msg1. Msg1 occasion can be the PRACH occasion in which random access preamble part of Msg1 is transmitted. Msg1 occasion can be the PUSCH occasion in which payload/MAC PDU part of Msg1 is transmitted. In another embodiment of the disclosure, the RA-RNTI may be derived based on at least the time/frequency location of Msg1 occasion in which Msg1 is transmitted and RAPID is included in the DCI of PDCCH addressed to RA-RNTI. The TB scheduled by PDCCH addressed to RA-RNTI may include a MAC PDU. RAPID may not be included in MAC PDU. In an embodiment of the disclosure, DCI in PDCCH addressed to RA-RNTI may include RNTI field which is set to TC-RNTI by gNB when CCCH SDU was received in Msg1.

In an embodiment of the disclosure, for Msg2, gNB may transmit a PDCCH addressed to C-RNTI when C-RNTI was received in Msg1 or when contention free random access preamble was received in Msg1. In case contention free random access preamble was received, gNB can identify the UE based on received contention free preamble as contention free preamble is assigned by gNB to UE.

In an embodiment of the disclosure, the 2 step RA procedure is considered successfully completed by UE based on the following operation:

Embodiment 6-1 (The Signaling Flow Between UE and gNB for Embodiment 6-1 is Shown in FIG. 20)

When the random access preamble transmitted in Msg1 was selected from contention based random access preambles and when UE has included (or transmitted) C-RNTI in Msg1 (i.e., in payload/MAC PDU part of Msg1), 2 step RA procedure is successfully completed when all of the following conditions are met:
UE receives PDCCH addressed to C-RNTI that matches the C-RNTI transmitted in Msg1;
The PDCCH may include UL assignment or DL assignment
(alternate 1) UE receives PDCCH addressed to C-RNTI that matches the C-RNTI transmitted in Msg1 and received PDCCH includes UL grant for new transmission;

Embodiment 6-1a (No Preamble Transmission Case)

when UE has included (or transmitted) C-RNTI in Msg1 (i.e., in payload/MAC PDU part of Msg1), 2 step RA procedure is successfully completed when all of the following conditions are met:
UE receives PDCCH addressed to C-RNTI that matches the C-RNTI transmitted in Msg1;
The PDCCH may include UL assignment or DL assignment
(alternate 1) UE receives PDCCH addressed to C-RNTI that matches the C-RNTI transmitted in Msg1 and received PDCCH includes UL grant for new transmission;

Embodiment 6-2 (The Signaling Flow Between UE and gNB is Shown in FIG. 12 or 18)

When the random access preamble transmitted in Msg1 was selected from contention based random access preambles and when UE has included (or transmitted) CCCH SDU in Msg1 (i.e., in payload/MAC PDU part of Msg1), 2 step RA procedure is successfully completed when all of the following conditions are met:
UE receives PDCCH addressed to RA-RNTI and received TB is successfully decoded (in an embodiment UE may additionally check for RAPID in DCI when DCI includes RAPID); and
MAC PDU includes contention resolution identity that matches the first X bits of CCCH SDU transmitted in Msg1. X is pre-defined. In an example, X can be 48 bits.

Embodiment 6-2a (No Preamble Transmission Case)

when UE has included (or transmitted) CCCH SDU in Msg1 (i.e., in payload/MAC PDU part of Msg1), 2 step RA procedure is successfully completed when all of the following conditions are met:
UE receives PDCCH addressed to RA-RNTI and received TB is successfully decoded (in an embodiment UE may additionally check for RAPID in DCI when DCI includes RAPID); and
MAC PDU includes contention resolution identity that matches the first X bits of CCCH SDU transmitted in Msg1. X is pre-defined. In an example, X can be 48 bits.

Embodiment 6-2b (This can be Applied when Msg2 Window Size is Greater than 1 Radio Frame.)

When the random access preamble transmitted in Msg1 was selected from contention based random access preambles and when UE has included (or transmitted) CCCH SDU in Msg1 (i.e., in payload/MAC PDU part of Msg1), 2 step RA procedure is successfully completed when all of the following conditions are met:

UE receives PDCCH addressed to RA-RNTI and received TB is successfully decoded;

Frame info (i.e. 'n' LSBs of SFN) received in MAC PDU matches the frame info (i.e. 'n' LSBs of SFN, n is pre-defined) corresponding to the SFN in which PRACH preamble was transmitted; and MAC PDU includes contention resolution identity that matches the first X bits of CCCH SDU transmitted in Msg1. X is pre-defined. In an example, X can be 48 bits.

In the embodiments of the disclosure, upon receiving the Msg1 successfully, Msg2 MAC PDU transmitted by gNB may include Contention Resolution Identity, C-RNTI, TA and UL grant. In an embodiment of the disclosure, UL grant may not be included. The above information may be included in a MAC subPDU of Msg2 MAC PDU. Upon successful completion of 2 step RA procedure, UE applies the received C-RNTI (or TC-RNTI) for UE specific PDCCH reception.

Embodiment 6-3 (The Signaling Flow Between UE and gNB is Shown in FIG. 21)

When UE has transmitted contention free preamble in Msg1, 2 step RA procedure is successfully completed when all of the following conditions are met:

UE receives PDCCH addressed to its C-RNTI (alternate 1) UE receives PDCCH addressed to C-RNTI and received PDCCH includes UL grant for new transmission;

It is to be noted that the above procedure only explains the procedure for the case complete Msg1 (i.e. both preamble and payload part of Msg1) is successfully received by gNB. It is also possible that gNB only receives the random access preamble and PUSCH part of Msg1 is not received successfully. In this case gNB can provide fallback information (i.e. RAPID, TA, TC-RNTI and UL Grant) which is explained later.

In the following description, MAC PDU for Msg2 which does not include DL SCH SDU(s) is described.

Embodiment 7

Figure 22:
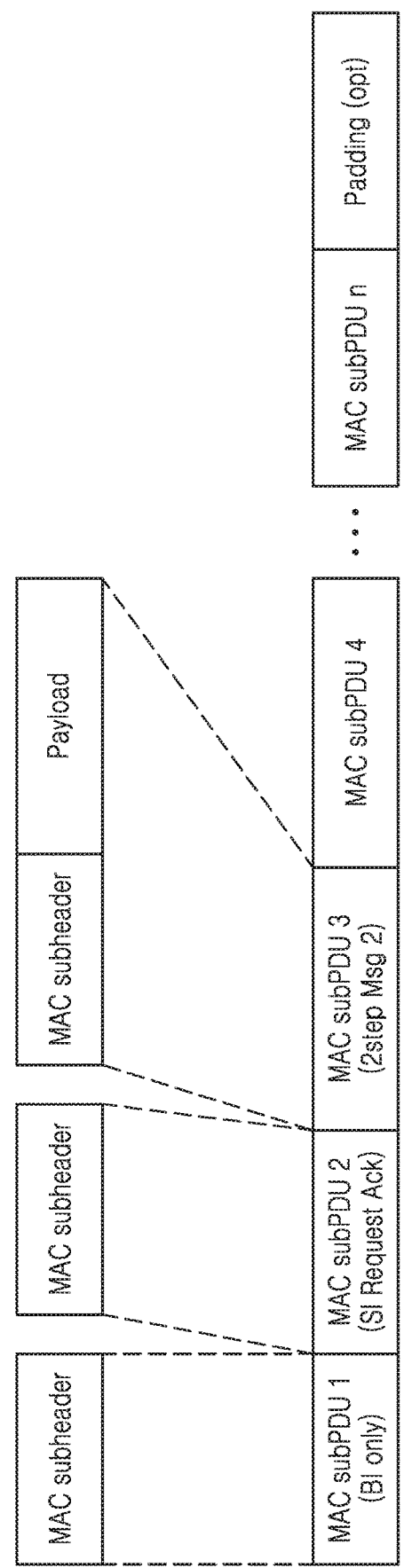
FIG. 22 illustrates MAC PDU for Msg2 of 2 step random access according to an embodiment of the disclosure.

FIG. 22 illustrates MAC PDU for Msg2 of 2 step random access according to an embodiment of the disclosure.

In an embodiment of the disclosure, random access preamble and other information (as explained earlier) may be transmitted in Msg1. For Msg2 of 2 step RA, PDCCH may be addressed to RA-RNTI and scheduled TB may include MAC PDU. In an embodiment of the disclosure, UE may monitor for PDCCH addressed to RA-RNTI after transmitting the Msg1 for 2 step RA.

In an embodiment of the disclosure, MAC PDU for Msg2 of 2 step RA may consist of one or more MAC subPDUs and optionally padding. Padding is placed at the end of the MAC PDU when present. Presence and length of padding is implicit based on TB size, size of MAC subPDU(s). Each MAC subPDU consists one of the following:

a MAC subheader with Backoff Indicator only; In an embodiment of the disclosure, this type of MAC subPDU may not be supported in Msg2 of 2 step RA.

a MAC subheader for acknowledgment for SI request; In an embodiment of the disclosure, this type of MAC subPDU may not be supported in Msg2 of 2 step RA.

a MAC subheader and payload for 2 step Msg2 or RAR. In an embodiment of the disclosure, there may be only one MAC subPDU of this type in MAC PDU.

An example of MAC PDU for Msg2 of 2 step RA is shown in FIG. 22.

In an embodiment of the disclosure, upon receiving Msg1 for 2 step RA, gNB will transmit in MAC subPDU for 2 step Msg2 one of the following set(s) of information:

1) RAPID, TA Command, UL Grant, C-RNTI and UE Contention Resolution Identity. In an embodiment of the disclosure, UL grant may not be present. In an embodiment RAPID may not be present. In an embodiment both UL grant and RAPID may not be present i.e. only C-RNTI, TA Command and UE Contention Resolution Identity is present. C-RNTI included is the C-RNTI newly assigned by gNB.

A. When Msg1 received by gNB includes CCCH SDU, gNB transmits a MAC subPDU in MAC PDU with this information.

2) RAPID, TA Command, UL Grant, C-RNTI. In an embodiment of the disclosure, UL grant may not be present. In an embodiment RAPID may not be present. In an embodiment both UL grant and RAPID may not be present i.e. only C-RNTI, TA Command and is present. C-RNTI included is the C-RNTI received in Msg1.

A. When Msg1 received by gNB includes C-RNTI, gNB transmits a MAC subPDU in MAC PDU, with this information.

3) RAPID, TA Command, UL Grant, TC-RNTI

A. When gNB only receives random access preamble in Msg1 and fails to decode other information in Msg1, gNB may transmit a MAC subPDU in MAC PDU with this information. This is an indication to UE to fall back to 4 step CBRA procedure i.e. transmit Msg3 and perform contention resolution using Msg4. TC-RNTI is assigned by gNB. Upon fallback if contention resolution is successful this TC-RNTI is promoted to C-RNTI. Otherwise it is discarded upon contention resolution failure.

In the MAC subPDU, the above information can be split into MAC subheader and Payload. The various embodiments to include the above information in MAC subPDU is further explained below.

Embodiment 7-1

In an embodiment of the disclosure, the payload in MAC subPDU may comprise one of the following set(s) of information:

1) Information Set 1: Type, TA Command, UL Grant, C-RNTI and UE Contention Resolution Identity (it is first X bits of CCCH SDU received in Msg1). In an embodiment of the disclosure, UL grant may not be present in this set.

2) Information Set 2: Type, TA Command, UL Grant, C-RNTI. In an embodiment of the disclosure, UL grant may not be present in this set.

3) Information Set 3: Type, TA Command, UL Grant, TC-RNTI. In an embodiment of the disclosure, this set may be present when fallback to 4 step CBRA is supported.

The type field is set to different value for each of these set of information. For example, Type field in payload may be set to 0, when payload includes information set 1. Type field in payload may be set to 1, when payload includes information set 2. Type field in payload may be set to 2, when payload includes information set 3.

When Msg1 received by gNB includes CCCH SDU, gNB may transmit a MAC subPDU in MAC PDU, wherein the MAC subheader of MAC subPDU includes the RAPID of random access preamble received in Msg1 and payload in MAC subPDU includes information set 1. In an alternate embodiment of the disclosure, when Msg1 received by gNB includes CCCH SDU, gNB may transmit a MAC subPDU in MAC PDU, wherein the MAC subheader of MAC subPDU does not include RAPID (as described in method 6 of contention resolution) of random access preamble received in Msg1 and payload in MAC subPDU includes information set 1.

When Msg1 received by gNB includes C-RNTI, gNB may transmit a MAC subPDU in MAC PDU, wherein the MAC subheader of MAC subPDU includes the RAPID of random access preamble received in Msg1 and payload in MAC subPDU includes information set 2. In an alternate embodiment of the disclosure, when Msg1 received by gNB may include C-RNTI, gNB transmits a MAC subPDU in MAC PDU, wherein the MAC subheader of MAC subPDU does not include the RAPID of random access preamble received in Msg1 and payload in MAC subPDU includes information set 2.

When gNB only receives random access preamble in Msg1 and fails to decode other information in Msg1, gNB may transmit a MAC subPDU in MAC PDU, wherein the MAC subheader of MAC subPDU includes the RAPID and in MAC subPDU includes information set 3. This is an indication to UE to fall back to 4 step CBRA procedure.

When RAPID in MAC subheader of MAC subPDU does not match with random access preamble transmitted by UE or when RAPID is not included, UE may use the Type field in payload to determine the size of payload in MAC subPDU and move to the start of next MAC subPDU (when available).

Embodiment 7-2

In an embodiment of the disclosure, the payload in MAC subPDU comprises of one of the following set(s) of information:

1) Information Set 1: TA Command, UL Grant, C-RNTI and UE Contention Resolution Identity (it is first X bits of CCCH SDU received in Msg1). In an embodiment of the disclosure, UL grant may not be present in this set.

2) Information Set 2: TA Command, UL Grant, C-RNTI. In an embodiment of the disclosure, UL grant may not be present in this set.

3) Information Set 3: TA Command, UL Grant, TC-RNTI. In an embodiment of the disclosure, this set may be present when fallback to 4 step CBRA is supported.

The type field in MAC subheader is set to different value for each of these set of information. For example, Type field in MAC subheader may set to X, when payload includes information set 1. Type field in subheader may set to Y, when payload includes information set 2. Type field in MAC subheader may set to Z, when payload includes information set 3.

When Msg1 received by gNB includes CCCH SDU, gNB may transmit a MAC subPDU in MAC PDU, wherein the MAC subheader of MAC subPDU includes the RAPID of random access preamble received in Msg1, MAC subheader type is set to X and payload in MAC subPDU includes information set 1. Alternately, when Msg1 received by gNB includes CCCH SDU, gNB may transmit a MAC subPDU in MAC PDU, wherein the MAC subheader of MAC subPDU does not include the RAPID of random access preamble (as described in method 6 of contention resolution) received in Msg1, MAC subheader type is set to X and payload in MAC subPDU includes information set 1.

When Msg1 received by gNB includes C-RNTI, gNB may transmit a MAC subPDU in MAC PDU, wherein the MAC subheader of MAC subPDU includes the RAPID of random access preamble received in Msg1, MAC subheader type is set to Y and in MAC subPDU includes information set 2. Alternately, when Msg1 received by gNB includes C-RNTI, gNB may transmit a MAC subPDU in MAC PDU, wherein the MAC subheader of MAC subPDU does not include the RAPID of random access preamble received in Msg1, MAC subheader type is set to Y and in MAC subPDU includes information set 2.

When gNB only receives random access preamble in Msg1 and fails to decode other information in Msg1, gNB may transmit a MAC subPDU in MAC PDU, wherein the MAC subheader of MAC subPDU includes the RAPID, MAC subheader type is set to Z and payload in MAC subPDU includes information set 3. This is an indication to UE to fall back to 4 step CBRA procedure.

Embodiment 7-3

In an embodiment of the disclosure, the payload in MAC subPDU comprises of one of the following set of information:

1) Information Set 1: TA Command, UL Grant, C-RNTI and UE Contention Resolution Identity (it is first X bits of CCCH SDU received in Msg1). In an embodiment of the disclosure, UL grant may not be present in this set.

2) Information Set 2: TA Command, UL Grant, C-RNTI. In an embodiment of the disclosure, UL grant may not be present in this set.

3) Information Set 3: TA Command, UL Grant, TC-RNTI. In an embodiment of the disclosure, this set may be present when fallback to 4 step CBRA is supported.

The RA-RNTI used to address the PDCCH for Msg2 may be differently derived for each of the above information set. A Msg2_type field can be included in RA-RNTI derivation as shown below:

$$RA\text{-}RNTI = 1 + s\_id + 14 * t\_id + 14 * 80 * f\_id + 14 * 80 * 8 * ul\_carrier\_id + 14 * 80 * 8 * 2 * Msg2\_Type$$

In an embodiment of the disclosure, Msg2_Type=1 (C-RNTI in Msg1); Msg2_Type=2 (CCCH SDU in Msg1); Msg2_Type=3 (Fallback case).

When the PDCCH for Msg2 is addressed to fixed RA-RNTI, distinct RA-RNTIs can be reserved for each of these three cases (C-RNTI in Msg1, CCCH SDU in Msg1 and fallback case).

When Msg1 received by gNB includes CCCH SDU, gNB may transmit a MAC subPDU in MAC PDU, wherein the MAC subheader of MAC subPDU includes the RAPID of random access preamble received in Msg1 and payload in MAC subPDU includes information set 1. In an embodiment RAPID may not be included in MAC subheader in this case. The PDCCH for Msg2 may be addressed to RA-RNTI wherein the Msg2_Type is set to X or The PDCCH for Msg2 is addressed to a pre-defined RA-RNTI for this case.

When Msg1 received by gNB includes C-RNTI, gNB may transmit a MAC subPDU in MAC PDU, wherein the MAC subheader of MAC subPDU includes the RAPID of random access preamble received in Msg1 and payload in MAC subPDU includes information set 2. In an embodiment of the disclosure, RAPID may not be included in MAC header in this case. The PDCCH for Msg2 may be addressed to RA-RNTI wherein the Msg2_Type is set to Y or The PDCCH for Msg2 is addressed to a pre-defined RA-RNTI for this case.

When gNB only receives random access preamble in Msg1 and fails to decode other information in Msg1, gNB may transmit a MAC subPDU in MAC PDU, wherein the MAC subheader of MAC subPDU includes the RAPID and payload in MAC subPDU includes information set 3. This is an indication to UE to fall back to 4 step CBRA procedure. The PDCCH for Msg2 is addressed to RA-RNTI wherein the Msg2_Type is set to Z or The PDCCH for Msg2 is addressed to a pre-defined RA-RNTI for this case.

X, Y and Z are distinct integers.

Embodiment 8

In an embodiment of the disclosure, random access preamble and other information (as explained earlier) may be transmitted in Msg1. For Msg2 of 2 step RA, PDCCH may be addressed to RA-RNTI and scheduled TB may include MAC PDU. In an embodiment of the disclosure, UE monitors for PDCCH addressed to RA-RNTI after transmitting the Msg1 for 2 step RA.

In an embodiment of the disclosure, MAC PDU for Msg2 of 2 step RA may consist of one or more MAC subPDUs and optionally padding. Padding is placed at the end of the MAC PDU when present. Presence and length of padding is implicit based on TB size, size of MAC subPDU(s). Each MAC subPDU consists one of the following:
- a MAC subheader with Backoff Indicator only; In an embodiment of the disclosure, this type of MAC subPDU may not be supported in Msg2 of 2 step RA.
- a MAC subheader for acknowledgment for SI request; In an embodiment of the disclosure, this type of MAC subPDU may not be supported in Msg2 of 2 step RA.
- a MAC subheader and payload for Msg2. In an embodiment of the disclosure, there may be only one MAC subPDU of this type in MAC PDU.

An example of MAC PDU for Msg2 of 2 step RA is shown in FIG. 22.

In an embodiment of the disclosure, upon receiving Msg1 for 2 step RA, gNB will transmit in MAC subPDU for Msg2 one of the following set(s) of information:

1) RAPID, TA Command, UL Grant, and UE Contention Resolution Identity. In an embodiment of the disclosure, UL grant may not be present. In an embodiment RAPID may not be included.

A. When Msg1 received by gNB includes CCCH SDU, gNB transmits a MAC subPDU in MAC PDU with this information.

2) RAPID, TA Command, UL Grant. In an embodiment of the disclosure, UL grant may not be present. In an embodiment RAPID may not be included.

A. When Msg1 received by gNB includes C-RNTI, gNB transmits a MAC subPDU in MAC PDU, with this information.

In the MAC subPDU, the above information can be split into MAC subheader and Payload. The various embodiments to include the above information in MAC subPDU is further explained below.

In an embodiment of the disclosure, the payload in MAC subPDU may comprise one of the following set(s) of information:

1) Information Set 1: TA Command, UL Grant and UE Contention Resolution Identity (it is first X bits of CCCH SDU received in Msg1). In an embodiment of the disclosure, UL grant may not be present in this set.

2) Information Set 2: TA Command, UL Grant. In an embodiment of the disclosure, UL grant may not be present in this set.

When Msg1 received by gNB includes CCCH SDU, gNB MAY transmit a MAC subPDU in MAC PDU, wherein the MAC subheader of MAC subPDU includes the RAPID of random access preamble received in Msg1 and payload in MAC subPDU includes information set 1. In an embodiment RAPID may not be included in MAC subheader in this case. RNTI in DCI may be set to TC-RNTI. When fallback bit included in DCI, it will be set to 0.

When Msg1 received by gNB includes C-RNTI, gNB may transmit a MAC subPDU in MAC PDU, wherein the MAC subheader of MAC subPDU includes the RAPID of random access preamble received in Msg1 and payload in MAC subPDU includes information set 2. RNTI in DCI may be set to C-RNTI. In an embodiment RAPID may not be included in MAC subheader in this case.

When gNB only receives random access preamble in Msg1 and fails to decode other information in Msg1, gNB may transmit a MAC subPDU in MAC PDU, wherein the MAC subheader of MAC subPDU includes the RAPID and payload in MAC subPDU includes information set 2. RNTI in DCI may be set to TC-RNTI. This is an indication to UE to fall back to 4 step CBRA procedure. In this case fallback bit is included in DCI and is set to 1.

Embodiment 9

Figure 23:
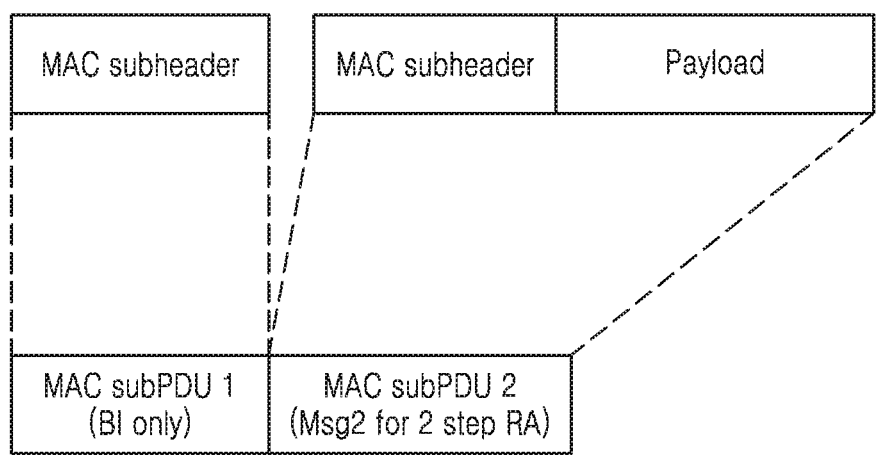
FIG. 23 illustrates another MAC PDU for Msg2 of 2 step random access according to an embodiment of the disclosure.
Figure 24:
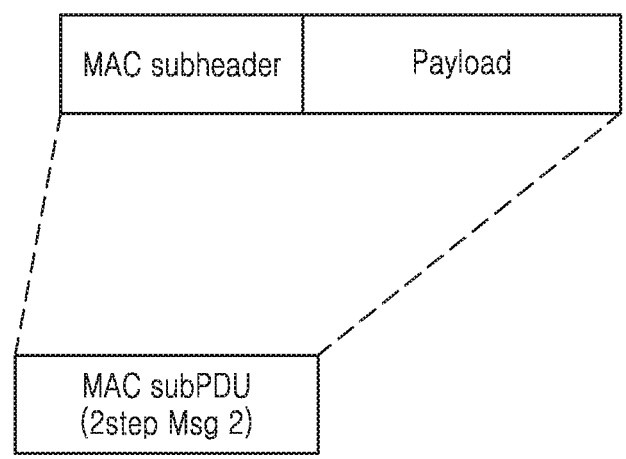
FIG. 24 illustrates another MAC PDU for Msg2 of 2 step random access according to an embodiment of the disclosure.

FIGS. 23 and 24 illustrate another MAC PDUs for Msg2 of 2 step random access according to an embodiment of the disclosure.

In an embodiment of the disclosure, random access preamble and other information (as explained earlier) is transmitted in Msg1. The embodiment can also be used when random access preamble is not transmitted in Msg1. For Msg2 of 2 step RA, PDCCH may be addressed to RA-RNTI and scheduled TB includes MAC PDU. In an embodiment of the disclosure, UE may monitor for PDCCH addressed to RA-RNTI after transmitting the Msg1 for 2 step RA. In the embodiment of the disclosure, when random access preamble is transmitted in Msg1, RAPID can be used to derive RA-RNTI or can be included in DCI of PDCCH addressed to RA-RNTI or can be skipped in Msg2 for case gNB receives both preamble and payload part of Msg1.

In an embodiment of the disclosure, MAC PDU for Msg2 of 2 step RA may consists of one or more MAC subPDUs and optionally padding. Padding is placed at the end of the MAC PDU when present. Presence and length of padding is implicit based on TB size, size of MAC subPDU(s). Each MAC subPDU consists one of the following:
- a MAC subheader with Backoff Indicator only; In an embodiment of the disclosure, this type of MAC subPDU may not be supported in Msg2 of 2 step RA.
- a MAC subheader and payload for 2 step Msg2 or RAR. In an embodiment of the disclosure, there may be only one MAC subPDU of this type in MAC PDU.

Examples of MAC PDU for Msg2 of 2 step RA are shown in FIG. 14 or 15.

In an embodiment of the disclosure, upon receiving Msg1 for 2 step RA, gNB will transmit in MAC subPDU for 2 step Msg2 one of the following set(s) of information:

1) TA Command, UL Grant, C-RNTI and UE Contention Resolution Identity. In an embodiment of the disclosure, UL grant may not be present.

A. When Msg1 received by gNB includes CCCH SDU, gNB transmits a MAC subPDU in MAC PDU with this information. C-RNTI included is the C-RNTI newly assigned by gNB.

2) TA Command, UL Grant, C-RNTI. In an embodiment of the disclosure, UL grant may not be present.

A. When Msg1 received by gNB includes C-RNTI, gNB transmits a MAC subPDU in MAC PDU, with this information. C-RNTI included is the C-RNTI received in Msg1.

3) TA Command, UL Grant, TC-RNTI

A. When gNB only receives random access preamble in Msg1 and fails to decode other information in Msg1, gNB may transmit a MAC subPDU in MAC PDU with this information. This is an indication to UE to fall back to 4 step CBRA procedure. Note that RAPID can be included when it is not included in RA-RNTI derivation or in DCI. TC-RNTI is assigned by gNB. Upon fallback if contention resolution is successful this TC-RNTI is promoted to C-RNTI. Otherwise it is discarded upon contention resolution failure.

In the MAC subPDU, the above information can be split into MAC subheader and Payload. The various embodiments to include the above information in MAC subPDU is further explained below.

Embodiment 9-1

In an embodiment of the disclosure, the payload in MAC subPDU may comprise one of the following set(s) of information:

1) Information Set 1: TA Command, UL Grant, C-RNTI and UE Contention Resolution Identity (it is first X bits of CCCH SDU received in Msg1). In an embodiment of the disclosure, UL grant may not be present in this set.

2) Information Set 2: TA Command, UL Grant, C-RNTI. In an embodiment of the disclosure, UL grant may not be present in this set.

3) Information Set 3: TA Command, UL Grant, TC-RNTI. In an embodiment of the disclosure, this set may be present when fallback to 4 step CBRA is supported.

The type field MAC subheader is set to different value for each of these set of information. For example, Type field in MAC subheader may be set to X, when payload includes information set 1. Type field in subheader may be set to Y, when payload includes information set 2. Type field in MAC subheader may be set to Z, when payload includes information set 3.

When Msg1 received by gNB includes CCCH SDU, gNB may transmit a MAC subPDU in MAC PDU, wherein the MAC subheader type is set to X and payload in MAC subPDU includes information set 1.

When Msg1 received by gNB includes C-RNTI, gNB may transmit a MAC subPDU in MAC PDU, wherein the MAC subheader type is set to Y and payload in MAC subPDU includes information set 2.

When gNB only receives random access preamble in Msg1 and fails to decode other information in Msg1, gNB may transmit a MAC subPDU in MAC PDU, wherein the MAC subheader type is set to Z and payload in MAC subPDU includes information set 3. This is an indication to UE to fall back to 4 step CBRA procedure. In this case RAPID can be included in payload or MAC subheader when not included in DCI or in RA-RNTI derivation.

Embodiment 10

When Msg1 includes C-RNTI or contention free random access preamble is transmitted in Msg1, Msg2 is PDCCH addressed to C-RNTI. gNB may schedule DL TB or UL TB as needed. For TA, gNB can include TA MAC CE in DL TB or can be included in DCI.

When Msg1 includes CCCH SDU then for Msg2, PDCCH is addressed to RA-RNTI and scheduled TB includes Msg2 MAC PDU. In an embodiment of the disclosure, MAC PDU for Msg2 of 2 step RA may consists of one or more MAC subPDUs and optionally padding. Padding is placed at the end of the MAC PDU when present. Presence and length of padding is implicit based on TB size, size of MAC subPDU(s). Each MAC subPDU consists one of the following:

a MAC subheader with Backoff Indicator only; In an embodiment of the disclosure, this type of MAC subPDU may not be supported in Msg2 of 2 step RA.

a MAC subheader for acknowledgment for SI request; In an embodiment of the disclosure, this type of MAC subPDU may not be supported in Msg2 of 2 step RA.

a MAC subheader and payload for 2 step Msg2 or RAR. In an embodiment of the disclosure, there may be only one MAC subPDU of this type in MAC PDU.

In an embodiment of the disclosure, when random access preamble is transmitted in Msg1, RAPID can be used to derive RA-RNTI or can be included in DCI of PDCCH addressed to RA-RNTI or can be skipped in Msg2. In this case RAPID is not included in MAC subheader for case both random access preamble and payload part of msgA is received by gNB. RAPID is included for the fallback case when not included in DCI or in RA-RNTI derivation.

Embodiment 10-1

In an embodiment of the disclosure, the payload in MAC subPDU comprises of one of the following set(s) of information:

1) Information Set 1: TA Command, UL Grant, C-RNTI and UE Contention Resolution Identity (it is first X bits of CCCH SDU received in Msg1). In an embodiment of the disclosure, UL grant may not be present in this set.

A. When Msg1 received by gNB includes CCCH SDU, gNB transmits a MAC subPDU in MAC PDU, wherein payload in MAC subPDU includes information set 1.

2) Information Set 2: RAPID, TA Command, UL Grant, TC-RNTI. In an embodiment of the disclosure, this set may be present when fallback to 4 step CBRA is supported.

A. When gNB only receives random access preamble in Msg1 and fails to decode other information in Msg1, gNB may transmit a MAC subPDU in MAC PDU, wherein payload in MAC subPDU includes information set 2. This is an indication to UE to fall back to 4 step CBRA procedure. In this case RAPID can be skipped from this information set when included in DCI or in RA-RNTI derivation.

When information set 2 is supported in addition to set 1, these two sets can be distinguished in one of the following ways:

1) A type field can be added in each information set. The type field is set to different value for each of these set of information.

2) Type field in MAC subheader can be set to different value to distinguish these set of information in payload. In an embodiment type field in MAC subheader can distinguish BI MAC subPDU, Msg2 MAC subPDU with information set 1 and Msg2 MAC subPDU with information set 2. In another embodiment of the disclosure, first 1 bit type field (T1) can bet set to 1 in subheader of MAC subPDU with information set 2 where subheader also includes RAPID. First 1 bit type (T1) field is set to 0 in subheader of MAC subPDU with information set 1 and in subheader of MAC subPDU with BI. A second type field (T2) is included in subheader of MAC subPDU with information set 1 and in subheader of MAC subPDU with BI to distinguish between these subheader. T2 can be set to zero in BI subheader. T2 can be set to one in subheader of MAC subPDU with information set 1.

3) The RA-RNTI used to address the PDCCH for Msg2 is differently derived for each of the above information set. A Msg2_type field can be included in RA-RNTI derivation as shown below:

$$RA\text{-}RNTI = 1 + s\_id + 14*t\_id + 14*80*f\_id + 14*80*8*ul\_carrier\_id + 14*80*8*2*Msg2\_Type$$

In an example, Msg2_Type=1 (CCCH SDU in Msg1); Msg2_Type=2 (Fallback case).

When the PDCCH for Msg2 is addressed to fixed RA-RNTI, distinct RA-RNTIs can be reserved for each of these three cases (CCCH SDU in Msg1 and fallback case).

When Msg1 received by gNB includes CCCH SDU, gNB may transmit a MAC subPDU in MAC PDU, wherein payload in MAC subPDU includes information set 1. The PDCCH for Msg2 may be addressed to RA-RNTI wherein the Msg2_Type is set to X or The PDCCH for Msg2 is addressed to a pre-defined RA-RNTI for this case.

When gNB only receives random access preamble in Msg1 and fails to decode other information in Msg1, gNB may transmit a MAC subPDU in MAC PDU, wherein payload in MAC subPDU includes information set 2. This is an indication to UE to fall back to 4 step CBRA procedure. The PDCCH for Msg2 is addressed to RA-RNTI wherein the Msg2_Type is set to Y or The PDCCH for Msg2 is addressed to a pre-defined RA-RNTI for this case.

X and Y are distinct integers.

Embodiment 10-2

In an embodiment of the disclosure, the payload in MAC subPDU comprises of one of the following set(s) of information:

1) Information Set 1: TA Command, UL Grant and UE Contention Resolution Identity (it is first X bits of CCCH SDU received in Msg1). In an embodiment of the disclosure, UL grant may not be present in this set.

A. When Msg1 received by gNB includes CCCH SDU, gNB transmits a MAC subPDU in MAC PDU, wherein payload in MAC subPDU includes information set 1.

2) Information Set 2: TA Command, UL Grant. In an embodiment of the disclosure, this set may be present when fallback to 4 step CBRA is supported.

A. When gNB only receives random access preamble in Msg1 and fails to decode other information in Msg1, gNB may transmit a MAC subPDU in MAC PDU, wherein payload in MAC subPDU includes information set 2. This is an indication to UE to fall back to 4 step CBRA procedure. In this case RAPID can be included in payload or MAC subheader when not included in DCI or in RA-RNTI derivation.

In this embodiment of the disclosure, TC-RNTI is included in DCI of PDCCH addressed to RA-RNTI. When information set 2 is supported in addition to set 1, these two sets can be distinguished in one of the ways as described in embodiment 1.

In the following description, MAC PDU for Msg2 which can include DL SCH SDU(s) is described.

The advantage of the below methods is that in addition to Msg2 for Msg1, the MAC PDU can include DL SDUs for one or more logical channels. This is useful to reduce latency.

Embodiment 11

Figure 25:
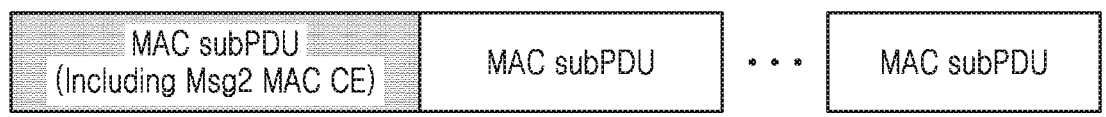
FIG. 25 illustrates DL SCH MAC PDU for Msg2 according to an embodiment of the disclosure.

FIG. 25 illustrates DL SCH MAC PDU for Msg2 according to an embodiment of the disclosure.

In an embodiment of the disclosure, random access preamble and other information (as explained earlier) may be transmitted in Msg1. In an embodiment of the disclosure, random access preamble may not be transmitted in Msg1. For Msg2 of 2 step RA, PDCCH is addressed to RA-RNTI and scheduled TB includes MAC PDU. The MAC PDU for Msg2 is a DL SCH MAC PDU. In an embodiment of the disclosure, UE may monitor for PDCCH addressed to RA-RNTI after transmitting the Msg1 for 2 step RA. In the embodiment of the disclosure, when random access preamble is transmitted in Msg1, RAPID can be used to derive RA-RNTI or can be included in DCI of PDCCH addressed to RA-RNTI or can be skipped in Msg2 for success case (i.e. both preamble and payload of Msg1 is received)

In an embodiment of the disclosure, following new MAC CEs are defined.

Msg2 MAC CE Type 1: This MAC CE consists of TA and C-RNTI

A. This MAC CE is transmitted by gNB in MAC PDU when C-RNTI was received in Msg1. C-RNTI included is the C-RNTI received in Msg1.

2) Msg2 MAC CE Type 2: This MAC CE consists of TA, C-RNTI and UE Contention Resolution Identity. C-RNTI included is the C-RNTI assigned to UE by GNB.

A. This MAC CE is transmitted by gNB in MAC PDU when CCCH SDU was received in Msg1. C-RNTI included is the C-RNTI assigned to UE by GNB.

3) Fallback MAC CE: This MAC CE consists of RAPID, TA, TC-RNTI and UL Grant TC-RNTI is assigned by gNB. Upon fallback if contention resolution is successful this TC-RNTI is promoted to C-RNTI. Otherwise it is discarded upon contention resolution failure.

A. When gNB only receives random access preamble in Msg1 and fails to decode other information in Msg1, gNB may transmit this MAC CE in MAC PDU. This is an indication to UE to fall back to 4 step CBRA procedure. In this case RAPID can also be included when not included in DCI or in RA-RNTI derivation.

An example of DL SCH MAC PDU for Msg2 is shown in FIG. 25.

In an embodiment of the disclosure, the first MAC subPDU in DL SCH MAC PDU for Msg2 includes one of the Msg2 MAC CE(s). This MAC subPDU is then followed by zero or more MAC subPDU(s).

When C-RNTI was included in Msg1:

C-RNTI in received Msg2 MAC CE Type 1 matches with C-RNTI transmitted in Msg1, UE processes other MAC sub PDUs in received MAC PDU When CCCH SDU was included in Msg1:

Contention Resolution Identity in received Msg2 MAC CE Type 2 matches with Y bits of CCCH SDU transmitted in Msg1, UE processes other MAC sub PDUs in MAC PDU. Y is pre-defined. In an example it can be 48 bits.

Embodiment 12

Figure 26:
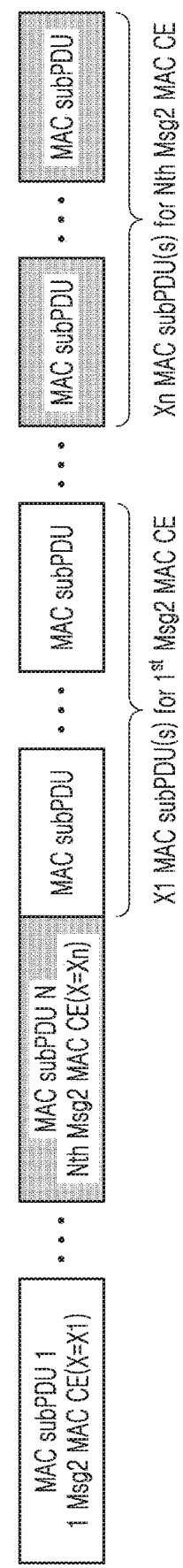
FIG. 26 illustrates another DL SCH MAC PDU for Msg2 according to an embodiment of the disclosure.

FIG. 26 illustrates another DL SCH MAC PDU for Msg2 according to an embodiment of the disclosure.

In an embodiment of the disclosure, random access preamble and other information (as explained earlier) is transmitted in Msg1. In an embodiment of the disclosure, random access preamble may not be transmitted in Msg1. For Msg2 of 2 step RA, PDCCH is addressed to RA-RNTI and scheduled TB includes MAC PDU. The MAC PDU for Msg2 is a DL SCH MAC PDU. In an embodiment of the disclosure, UE may monitor for PDCCH addressed to RA-RNTI after transmitting the Msg1 for 2 step RA. In this embodiment of the disclosure, when random access preamble is transmitted in Msg1, RAPID can be used to derive RA-RNTI or can be included in DCI of PDCCH addressed to RA-RNTI or can be skipped in Msg2 for success case (i.e. both preamble and payload of Msg1 is received). RAPID is included for the fallback case when not included in DCI or in RA-RNTI derivation.

In an embodiment of the disclosure, following new MAC CEs are defined.

Msg2 MAC CE Type 1: This MAC CE consists of TA, C-RNTI and X

A. This MAC CE is transmitted by gNB in MAC PDU when C-RNTI was received in Msg1. C-RNTI included is the C-RNTI received in Msg1.

2) Msg2 MAC CE Type 2: This MAC CE consists of TA, C-RNTI, UE Contention Resolution Identity and X. C-RNTI included is the C-RNTI assigned newly by gNB.

A. This MAC CE is transmitted by gNB in MAC PDU when CCCH SDU was received in Msg1.

3) Fallback MAC CE: This MAC CE consists of TA, TC-RNTI and UL Grant. TC-RNTI is assigned by gNB. Upon fallback if contention resolution is successful this TC-RNTI is promoted to C-RNTI. Otherwise it is discarded upon contention resolution failure.

A. When gNB only receives random access preamble in Msg1 and fails to decode other information in Msg1, gNB may transmit this MAC CE in MAC PDU. This is an indication to UE to fall back to 4 step CBRA procedure. In this case RAPID can also be included when not included in DCI or in RA-RNTI derivation.

An example of DL SCH MAC PDU for Msg2 is shown in FIG. 26.

In an embodiment of the disclosure, N Msg2 MAC CE(s) are included in the beginning of DL SCH MAC PDU for Msg2. The MAC subPDU(s) carrying Msg2 MAC CE(s) are then followed by zero or more MAC subPDU(s).

When C-RNTI was included in Msg1:
C-RNTI in received Msg2 MAC CE Type 1 matches with C-RNTI transmitted in Msg1, UE processes X MAC sub PDUs in DL SCH MAC PDU corresponding to this Msg2 MAC CE When CCCH SDU was included in Msg1:
Contention Resolution Identity in received Msg2 MAC CE Type 2 matches with Y bits of CCCH SDU transmitted in Msg1, UE processes X MAC sub PDUs in DL SCH MAC PDU corresponding to this Msg2 MAC CE.

Embodiment 13

Figure 27:
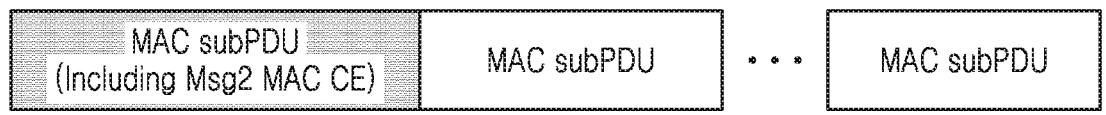
FIG. 27 illustrates another DL SCH MAC PDU for Msg2 according to an embodiment of the disclosure.

FIG. 27 illustrates another DL SCH MAC PDU for Msg2 according to an embodiment of the disclosure.

In an embodiment of the disclosure, random access preamble and other information (as explained earlier) is transmitted in Msg1. In an embodiment of the disclosure, random access preamble may not be transmitted in Msg1.

When Msg1 includes C-RNTI or contention free random access preamble is transmitted in Msg1, Msg2 is PDCCH addressed to C-RNTI. gNB may schedule DL TB or UL TB as needed. For TA, gNB can include TA MAC CE when needed.

When CCCH SDU is transmitted in Msg1, PDCCH is addressed to RA-RNTI and scheduled TB includes MAC PDU. The MAC PDU for Msg2 is a DL SCH MAC PDU. In this embodiment of the disclosure, when random access preamble is transmitted in Msg1, RAPID can be used to derive RA-RNTI or can be included in DCI of PDCCH addressed to RA-RNTI or can be skipped in Msg2 for success case (i.e. both preamble and payload of Msg1 is received). RAPID is included for the fallback case when not included in DCI or in RA-RNTI derivation.

In an embodiment of the disclosure, following new MAC CEs are defined.

1) Msg2 MAC CE Type 1: This MAC CE consists of TA, C-RNTI and UE Contention Resolution Identity A. This MAC CE is transmitted by gNB in MAC PDU when CCCH SDU was received in Msg1. C-RNTI included is the C-RNTI assigned newly by gNB.

2) Fallback MAC CE: This MAC CE consists of TA, TC-RNTI and UL Grant. TC-RNTI is assigned by gNB. Upon fallback if contention resolution is successful this TC-RNTI is promoted to C-RNTI. Otherwise it is discarded upon contention resolution failure.

A. When gNB only receives random access preamble in Msg1 and fails to decode other information in Msg1, gNB may transmit this MAC CE in MAC PDU. This is an indication to UE to fall back to 4 step CBRA procedure. In this case RAPID can also be included when not included in DCI or in RA-RNTI derivation.

An example of DL SCH MAC PDU for Msg2 is shown in FIG. 27.

In an embodiment of the disclosure, the first MAC subPDU in DL SCH MAC PDU for Msg2 includes one of the Msg2 MAC CE(s). This MAC subPDU is then followed by zero or more MAC subPDU(s).

When CCCH SDU was included in Msg1
Contention Resolution Identity in received Msg2 MAC CE Type 1 matches with X bits of CCCH SDU transmitted in Msg1, UE processes other MAC sub PDUs in MAC PDU

Embodiment 14

Figure 28:
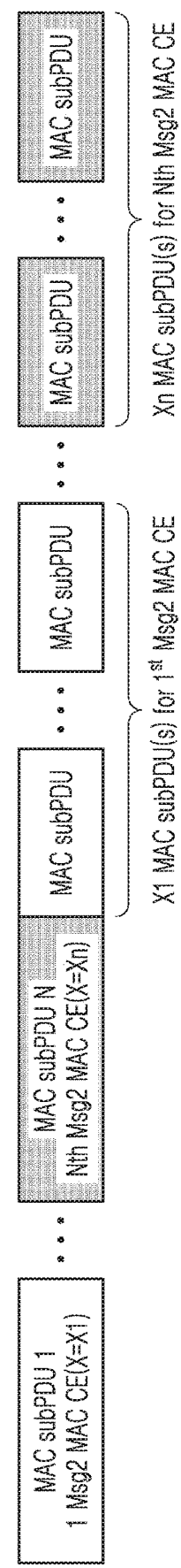
FIG. 28 illustrates another DL SCH MAC PDU for Msg2 according to an embodiment of the disclosure.

FIG. 28 illustrates another DL SCH MAC PDU for Msg2 according to an embodiment of the disclosure.

In an embodiment of the disclosure, random access preamble and other information (as explained earlier) is transmitted in Msg1. In an embodiment of the disclosure, random access preamble may not be transmitted in Msg1.

When Msg1 includes C-RNTI or contention free random access preamble is transmitted in Msg1, Msg2 is PDCCH addressed to C-RNTI. gNB may schedule DL TB or UL TB as needed. For TA, gNB can include TA MAC CE when needed.

When CCCH SDU is transmitted in Msg1, PDCCH is addressed to RA-RNTI and scheduled TB includes MAC PDU. The MAC PDU for Msg2 is a DL SCH MAC PDU. In this embodiment when random access preamble is transmitted in Msg1, RAPID can be used to derive RA-RNTI or can be included in DCI of PDCCH addressed to RA-RNTI or can be skipped in Msg2 for success case (i.e. both preamble and payload of Msg1 is received). RAPID is included for the fallback case when not included in DCI or in RA-RNTI derivation.

In an embodiment of the disclosure, following new MAC CEs are defined.

1) Msg2 MAC CE Type 1: This MAC CE consists of TA, C-RNTI, UE Contention Resolution Identity and X. C-RNTI included is the C-RNTI assigned newly by gNB.

A. This MAC CE is transmitted by gNB in MAC PDU when CCCH SDU was received in Msg1.

2) Fallback MAC CE: This MAC CE consists of TA, TC-RNTI and UL Grant. TC-RNTI is assigned by gNB. Upon fallback if contention resolution is successful this TC-RNTI is promoted to C-RNTI. Otherwise it is discarded upon contention resolution failure.

A. When gNB only receives random access preamble in Msg1 and fails to decode other information in Msg1, gNB may transmit this MAC CE in MAC PDU. This is an indication to UE to fall back to 4 step CBRA procedure. In this case RAPID can also be included when not included in DCI or in RA-RNTI derivation.

An example of DL SCH MAC PDU for Msg2 is shown in FIG. 26.

In an embodiment of the disclosure, N Msg2 MAC CE(s) are included in the beginning of DL SCH MAC PDU for Msg2. The MAC subPDU(s) carrying Msg2 MAC CE(s) are then followed by zero or more MAC subPDU(s).

When CCCH SDU was included in Msg1:
Contention Resolution Identity in received Msg2 MAC CE Type 2 matches with Y bits of CCCH SDU transmitted in Msg1, UE processes Y MAC sub PDUs in DL SCH MAC PDU corresponding to this Msg2 MAC CE In the following description, method for Fallback to 4 step RA procedure is described.

UE transmits random access preamble and additional information (i.e. payload/MAC PDU as explained earlier) in Msg1. It is possible that gNB may only receive random access preamble. gNB cannot decode additional information (such as payload/MAC PDU carrying CCCH SDU/C-RNTI). In this situation gNB can transmit fallback indication in response to received Msg1. Fallback indication can comprise of RAPID, TA, UL grant and TC-RNTI. The fallback can be signaled in one of the ways as described earlier in the MAC PDU format discussion. Upon receiving the fallback indication or information wherein the received RAPID matches with RAPID of random access preamble transmitted by UE in Msg1, UE falls back to 4 step CBRA, i.e. UE transmits Msg3 in UL grant received in RAR. In an alternate embodiment wherein Msg2 reception window is larger than radio frame i.e. 10 ms, upon receiving the fallback indication or information wherein the received RAPID matches with RAPID of random access preamble transmitted by UE in Msg1 and frame info (i.e. 'n' LSBs of SFN) received matches the frame info (i.e. 'n' LSBs, 'n' can be pre-defined or depends on RAR window size e.g. if RAR window size is 40 ms, n is 2) of SFN in which UE has transmitted preamble in Msg1, UE falls back to 4 step CBRA, i.e. UE transmits Msg3 in UL grant received in RAR. UE will start contention resolution timer and wait for contention resolution as in 4 step RA procedure. When the contention resolution timer expires, UE perform the next attempt of random access. In an embodiment of the disclosure, UE will transmit Msg1 according to 2 step RA during the next attempt of random access. In an alternate embodiment of the disclosure, UE will transmit Msg2 according to 4 step RA during the next attempt of random access. In an embodiment of the disclosure, when UE receives a fall back indication, then all subsequent random access attempt of the random access procedure are proceeded based on 4 step RA. In an alternate embodiment of the disclosure, when UE receives a fall back indication, then the subsequent random access attempts of the random access procedure are proceeded based on 2 step RA.

In an embodiment of the disclosure, UE can operation for Msg2 reception can be as follows:

Embodiment 15

In an embodiment of the disclosure, after transmitting the Msg1, UE monitor PDCCH for Msg2 reception using a single RA-RNTI for Msg2. In an embodiment of the disclosure, after transmitting the Msg1, UE may monitor PDCCH for Msg2 reception using two types of RA-RNTI. The first type of RA-RNTI is for receiving Msg2 including fall back information from gNB. The second type of RA-RNTI is for receiving Msg2 including contention resolution information corresponding to transmitted Msg1. In this case, 1) In an embodiment of the disclosure, the second type of RA-RNTI may be a fixed/pre-defined RA-RNTI and the first type of RA-RNTI is the RA-RNTI derived based on RACH occasion in which Msg1 is transmitted.

First type of RA-RNTI=$1+s\_id+14*t\_id+14*80*f\_id+14*80*8*ul\_carrier\_id$.

2) In another embodiment of the disclosure, the first and second type of RA-RNTI may be derived based on RACH occasion and RACH Type wherein RACH type is set to 1 for second type of RA-RNTI and RACH type is set to 0 for first type of RA-RNTI.

$$RA\text{-}RNTI=1+s\_id+14*t\_id+14*80*f\_id+14*80*8*ul\_carrier\_id+14*80*8*2*RACH\_Type$$

Where RACH Type=0 for first type of RA-RNTI; RACH Type=1 for second type of RA-RNTI
s_id is the index of the first OFDM symbol of the specified PRACH or Msg1 occasion ($0 \leq s\_id < 14$),
t_id is the index of the first slot of the specified PRACH or Msg1 occasion ($0 \leq t\_id < 80$).
f_id is the index of the specified PRACH within the slot in the frequency domain
ul_carrier_id is the UL carrier used for Msg1 transmission (0 for NUL and 1 for SUL)

3) In another embodiment of the disclosure, the first and second type of RA-RNTI are derived based on RACH occasion wherein RAPID is also included in RA-RNTI derivation for second type of RA-RNTI and RAPID is not included in RA-RNTI derivation for first type of RA-RNTI.

Second type of RA-RNTI=$1+s\_id+14*t\_id+14*80*f\_id+14*80*8*ul\_carrier\_id+14*80*8*2*RAPID$
First type of RA-RNTI=$1+s\_id+14*t\_id+14*80*f\_id+14*80*8*ul\_carrier\_id$
s_id is the index of the first OFDM symbol of the specified PRACH or Msg1 occasion ($0 \leq s\_id < 14$),
t_id is the index of the first slot of the specified PRACH or Msg1 occasion ($0 \leq t\_id < 80$).
f_id is the index of the specified PRACH within the slot in the frequency domain
ul_carrier_id is the UL carrier used for Msg1 transmission (0 for NUL and 1 for SUL)

4) In an embodiment of the disclosure, the first and second type of RA-RNTI derived based on RACH occasion in which Msg1 is transmitted wherein the UL carrier ID is set to 0 or 1 for first type of RA-RNTI and UL carrier ID is set to 2 and 3 for second type of RA-RNTI.

RA-RNTI=1+$s\_id$+14*$t\_id$+14*80*$f\_id$+ 14*80*8*$ul\_carrier\_id$

Where RACH Type=0 for first type of RA-RNTI; RACH Type=1 for second type of RA-RNTI
$s\_id$ is the index of the first OFDM symbol of the specified PRACH or Msg1 occasion (0≤$s\_id$<14),
$t\_id$ is the index of the first slot of the specified PRACH or Msg1 occasion (0≤$t\_id$<80).
$f\_id$ is the index of the specified PRACH within the slot in the frequency domain
$ul\_carrier\_id$ is the UL carrier used for Msg1 transmission
0 for NUL and 1 for SUL for first type of RA-RNTI
2 for NUL and 3 for SUL for second type of RA-RNTI The TB scheduled by PDCCH addressed to first type of RA-RNTI includes legacy RAR MAC PDU. The TB scheduled by PDCCH addressed to second type of RA-RNTI includes new RAR MAC PDU as described earlier.

When UE receives PDCCH addressed to first type of RA-RNTI and received TB is successfully decoded and RAPID in RAR MAC PDU matches the random access preamble transmitted by UE, UE will perform fall back i.e. UE uses the UL grant in RAR to transmit Msg3.

The UE operation on receiving PDCCH addressed to second type of RA-RNTI is as explained earlier under the description of methods for 'criteria for successful completion of 2 step RA'. The details of MAC PDU format in this case is as explained under the description of "MAC PDU for Msg2".

Embodiment 16

In another embodiment of the disclosure, after transmitting the Msg1, UE may monitor PDCCH for Msg2 reception using two types of CORESETs. CORESETs are signaled by gNB in SI and/or RRC signaling. The first type of CORESET is for receiving Msg2 including fall back information from gNB. The second type of CORESET is for receiving Msg2 including contention resolution information corresponding to transmitted Msg1.

The TB scheduled by PDCCH received in first CORESET includes legacy RAR MAC PDU. The TB scheduled by PDCCH received in second CORESET includes new RAR MAC PDU as described earlier.

When UE receives PDCCH addressed to RA-RNTI in first CORESET and received TB is successfully decoded and RAPID in RAR MAC PDU matches the random access preamble transmitted by UE, UE will perform fall back i.e. UE uses the UL grant in RAR to transmit Msg3.

The UE operation on receiving PDCCH addressed to RA-RNTI in second CORESET is as explained earlier under the description of criteria for successful completion of 2 step RA. The details of MAC PDU format in this case is as explained earlier under the description of MAC PDU for Msg2.

The above embodiments may be implemented separately or in combination within the scope of understanding of those of ordinary skill in the art.

Figure 29:
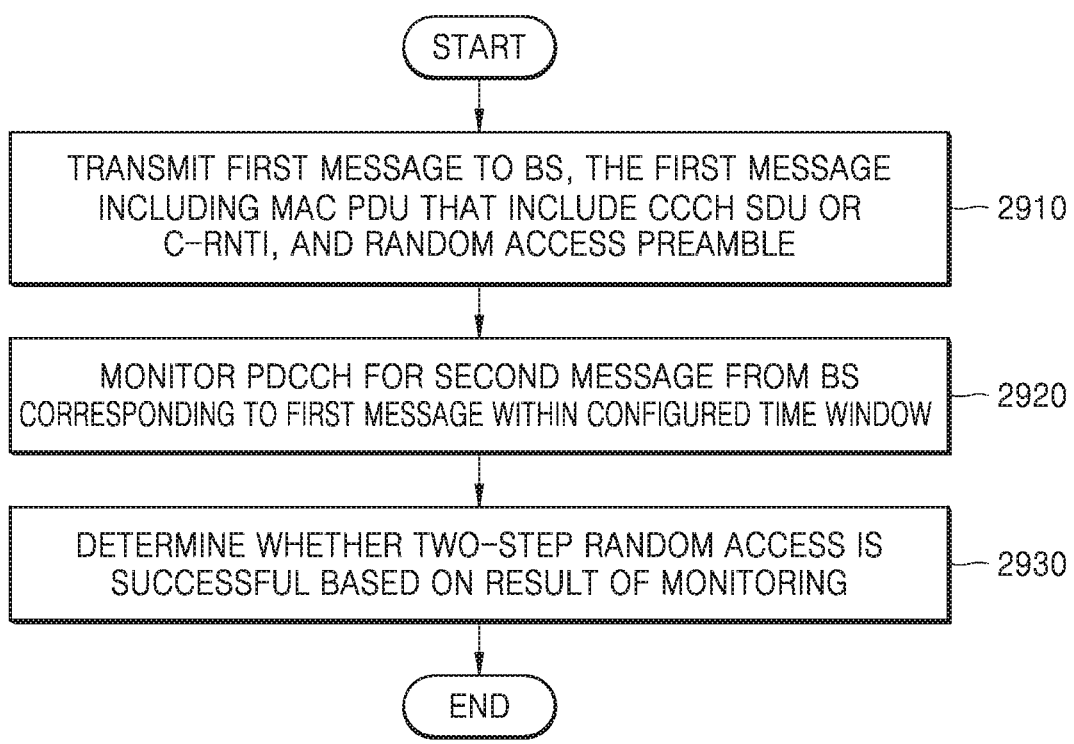
FIG. 29 is a flowchart illustrating operation of a UE, according to an embodiment of the disclosure.

FIG. 29 is a flowchart illustrating operation of a UE, according to an embodiment of the disclosure.

In operation 2910, a UE may transmit a first message to a BS, the first message including a medium access control (MAC) packet data unit (PDU) that includes a CCCH SDU or a C-RNTI, and a random access preamble.

In an embodiment of the disclosure, the random access preamble may be transmitted on a PRACH occasion, and the MAC PDU may be transmitted on a physical uplink shared channel (PUSCH). The preamble and the MAC PDU may be consecutively transmitted.

In an embodiment of the disclosure, a time window may start after a set offset after the first message is transmitted. The offset may have a value equal to or greater than zero. For example, the time window may start right after the first message is transmitted. The time window may start not after the preamble is transmitted but after the preamble and the MAC PDU are both transmitted.

In an embodiment of the disclosure, the UE may transmit the first message to the BS, the first message including a random access preamble and a MAC PDU that includes a CCCH SDU. In another embodiment of the disclosure, the UE may transmit the first message to the BS, the first message including the random access preamble and a MAC PDU that includes a C-RNTI. In an embodiment of the disclosure, while in the RRC_idle state or RRC_inactive state or during RRC connection re-establishment, the UE may transmit the first message including a random access preamble and a MAC PDU that includes a CCCH SDU, and while in the RRC_connected state, the UE may transmit the first message including the random access preamble and a MAC PDU that includes a C-RNTI. It is not, however, limited thereto, and the UE may transmit the MAC PDU including the CCCH SDU or C-RNTI while in any of various RRC_connected states.

In operation 2920, the UE may monitor a PDCCH for a second message from the BS corresponding to the first message within the configured time window.

In an embodiment of the disclosure, after the UE transmits the first message including the MAC PDU that includes a CCCH SDU along with the random access preamble in operation 2910, the UE may monitor a PDCCH addressed to an RA-RNTI in operation 2920.

In an embodiment of the disclosure, after transmitting the first message including the MAC PDU that includes a C-RNTI along with the random access preamble in operation 2910, the UE may monitor the PDCCH addressed to the RA-RNTI in operation 2920 and a PDCCH addressed to the same C-RNTI as the C-RNTI transmitted in operation 2910.

In the disclosure, being addressed to a particular RNTI means that the particular RNTI is used for scrambling of a CRC appended to the payload of a DCI message transmitted on the PDCCH. In other words, the RNTI may be transmitted not explicitly but in a CRC calculation process. When receiving the DCI message on the PDCCH, the UE may check the CRC using the particular RNTI. When the result of the CRC check is correct, the UE may determine that the message is transmitted to the UE.

In operation 2930, the UE may determine whether the two-step random access is successful, based on a result of the monitoring.

In an embodiment of the disclosure, after the UE transmits the first message including the MAC PDU that includes a CCCH SDU along with the random access preamble in operation 2910, the UE may receive a second message based on a PDCCH addressed to a RA-RNTI received from the BS, in operation 2930. In other words, the UE may receive the second message scheduled on the PDCCH addressed to the RA-RNTI. In this case, when a MAC PDU of the second message includes contention resolution identity (ID) that matches first X bits of the CCCH SDU included in the MAC PDU of the first message transmitted in operation 2910, the UE may determine that the two-step random access is successful. The X may be 48. The MAC PDU of the second message may include one or more DL SDU(s) for at least one logic channel (for SRB and/or DRB). The second message may further include information such as TA, C-RNTI, etc.

In an embodiment of the disclosure, after transmitting the first message including the MAC PDU that includes the C-RNTI along with the random access preamble in operation 2910, the UE may determine that the two-step random access is successful when receiving from the BS a PDCCH addressed to the same C-RNTI as the C-RNTI included in the MAC-PDU of the first message transmitted in operation 2910, in operation 2930. In another embodiment of the disclosure, after transmitting the first message including the MAC PDU that includes the C-RNTI along with the random access preamble in operation 2910, the UE may receive from the BS a PDCCH addressed to the same C-RNTI as the C-RNTI included in the MAC-PDU of the first message transmitted in operation 2910 and determine that the two-step random access is successful when the PDCCH addressed to the received C-RNTI includes UL grant, in operation 2930. The second message may further include information such as TA.

In an embodiment of the disclosure, the UE may receive the second message from the BS based on the PDCCH for the second message, and determine that fallback is indicated when the MAC PDU of the second message includes fallback information wherein RAPID in the fallback information matches the random access preamble. In operation 2910, when the BS may receive the random access preamble from the UE without receiving extra information, e.g., the MAC PDU including a CCCH SDU or a C-RNTI, the BS may transmit the second message to the UE, the second message including an RAPID matching the random access preamble received in operation 2910.

In an embodiment of the disclosure, when the UE determines that fallback is indicated by gNB, the UE may fall back to the four-step contention-based random access procedure. In this case, the second message may further include UL grant, and the UE may transmit a third message to the BS based on the UL grant. The third message may correspond to Msg3 of the four-step random access procedure as described above in connection with FIG. 4. The second message may further include information such as TA, TC-RNTI, back-off information, etc. In an embodiment of the disclosure, by performing the fall-back procedure, random access may be performed by the four-step random access procedure when the two-step random access has failed.

Figure 30:
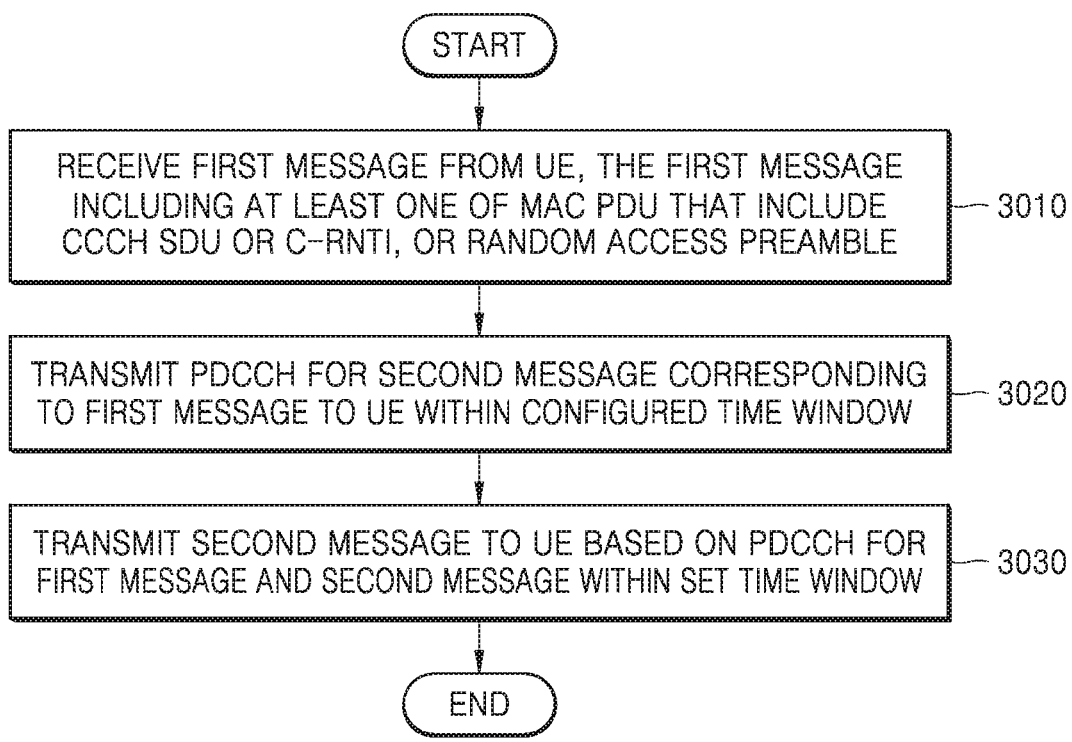
FIG. 30 is a flowchart illustrating operation of a BS, according to an embodiment of the disclosure.

FIG. 30 is a flowchart illustrating operation of a BS, according to an embodiment of the disclosure.

In operation 3010, the BS may receive the first message from the UE, the first message including at least one of a MAC PDU that includes a CCCH SDU or a C-RNTI, or a random access preamble.

In an embodiment of the disclosure, the random access preamble may be received on a PRACH occasion, and the MAC PDU may be received on a PUSCH. The preamble and the MAC PDU may be consecutively received.

In an embodiment of the disclosure, the first message may include the MAC PDU including a CCCH SDU along with the random access preamble. Furthermore, the first message may include the MAC PDU including a C-RNTI along with the random access preamble. Moreover, the first message may include only the random access preamble. In an embodiment of the disclosure, while in the RRC_idle state, the first message may include a random access preamble and a MAC PDU that includes a CCCH SDU, and while in the RRC_connected state, the first message may include the random access preamble and a MAC PDU that includes a C-RNTI. It is not, however, limited thereto, and the first message may include the MAC PDU including the CCCH SDU or C-RNTI while in any of various RRC_connected states.

In an embodiment of the disclosure, the first message may include only the random access preamble. Specifically, in operation 3010, the BS may receive the random access preamble from the UE without receiving extra information, e.g., the MAC PDU including a CCCH SDU or a C-RNTI.

In operation 3020, the BS may transmit a PDCCH for a second message corresponding to the first message to the UE within a configured time window.

In an embodiment of the disclosure, the time window may start after a set offset after the first message is transmitted. The offset may have a value equal to or greater than zero. For example, the time window may start right after the first message is transmitted. The time window may start not after the preamble is transmitted but after the preamble and the MAC PDU are both transmitted.

In an embodiment of the disclosure, when the first message includes the MAC PDU including a CCCH SDU along with the random access preamble in operation 3010, the BS may transmit a PDCCH addressed to the RA-RNTI.

In an embodiment of the disclosure, when the first message includes the MAC PDU that includes a C-RNTI along with the random access preamble in operation 3010, the BS may transmit a PDCCH addressed to the RA-RNTI and a PDCCH addressed to the same C-RNTI as the C-RNTI received in operation 3010. Furthermore, the BS may transmit UL grant to the UE on the PDCCH.

In the disclosure, being addressed to a particular RNTI means that the particular RNTI is used for scrambling of a CRC appended to the payload of a DCI message transmitted on the PDCCH. In other words, the RNTI may be transmitted not explicitly but in a CRC calculation process. When receiving the DCI message on the PDCCH, the UE may check the CRC using the particular RNTI. When the result of the CRC check is correct, the UE may determine that the message is transmitted to the UE.

In operation 3030, the BS may transmit a second message to the UE based on the PDCCH for the first and second messages within the configured time window.

In an embodiment of the disclosure, when the first message includes the MAC PDU including a CCCH SDU along with the random access preamble in operation 3010, the second message may include a MAC PDU including a contention resolution identity that matches first X bits of the CCCH SDU. The X may be 48. The MAC PDU of the second message may include a DL SDU for at least one logic channel. The second message may further include information such as TA, C-RNTI, etc.

In an embodiment of the disclosure, when the first message includes the MAC PDU including a C-RNTI along with the random access preamble in operation 3010, the second message may further include the information such as the TA or the like.

In an embodiment of the disclosure, when the first message includes only a random access preamble in operation 3010, the BS may transmit a second message to the UE, the second message including a MAC PID that includes an RAPID that matches the random access preamble received in operation 3010. The RAPID included in the second message may be an indicator to notify the UE that the two-step random access has failed.

Afterward, the UE may fall back to the four-step contention-based random access procedure. In this case, the second message may further include UL grant, and the BS may receive a third message based on the UL grant. The third message may correspond to Msg3 of the four-step random access procedure as described above in connection with FIG. 4. The second message may further include information such as TA, TC-RNTI, back-off information, etc. In an embodiment of the disclosure, by performing the fall-back procedure, random access may be performed by the four-step random access procedure when the two-step random access has failed.

Figure 31:
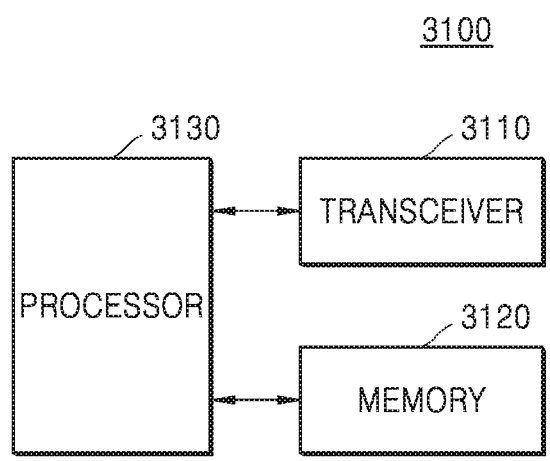
FIG. 31 is a block diagram illustrating a UE according to an embodiment of the disclosure.

FIG. 31 is a block diagram illustrating a UE according to an embodiment of the disclosure.

Referring to FIG. 31, the device 3100 may include a transceiver 3110, a memory 3120 and a processor 3130, However, all of the illustrated components are not essential. The device 3100 may be implemented by more or less components than those illustrated in FIG. 31. In addition, the transceiver 3110, the memory 3120 and the processor 3130 may be implemented as a single chip according to another embodiment. Furthermore, the transceiver 3110, the memory 3120, and/or the processor 3130 may include at least one transceiver, at least one memory and/or at least one processor, respectively.

The aforementioned components will now be described in detail.

The transceiver 3110 may include a RF transmitter for up-converting and amplifying a transmitted signal, and a RF receiver for down-converting a frequency of a received signal. However, according to another embodiment of the disclosure, the transceiver 3110 may be implemented by more or less components than those illustrated in components.

The transceiver 3110 may be connected to the processor 3130 and transmit and/or receive a signal. The signal may include control information and data. In addition, the transceiver 3110 may receive the signal through a wireless channel and output the signal to the processor 3130. The transceiver 3110 may transmit a signal output from the processor 3130 through the wireless channel.

The memory 3120 may store the control information or the data included in a signal obtained by the device 3100. The memory 3120 may be connected to the processor 3130 and store at least one instruction or a protocol or a parameter for the proposed function, process, and/or method. The memory 3120 may include read-only memory (ROM) and/or random access memory (RAM) and/or hard disk and/or CD-ROM and/or DVD and/or other storage devices.

The processor 3130 may control the proposed function, process, and/or method. Operation of the device 3100 may be implemented by the processor 3130.

In an embodiment of the disclosure, the processor 3130 may transmit the first message including a MAC PDU that includes a CCCH SDU or a C-RNTI and a random access preamble to the BS, monitor a PDCCH for a second message from the BS corresponding to the first message within a configured time window, and determine whether the two-step random access is successful based on the monitoring result.

Figure 32:
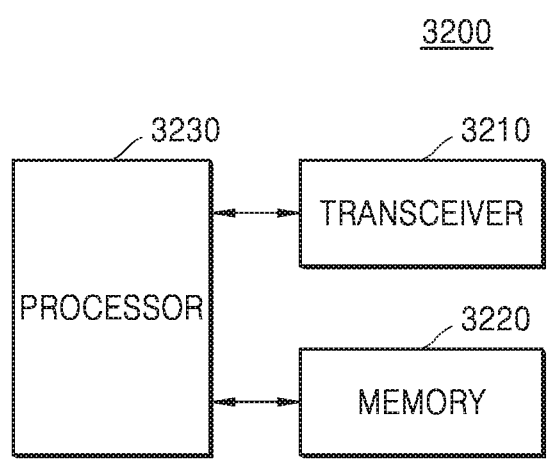
FIG. 32 is a block diagram illustrating a BASE STATION (BS) according to an embodiment of the disclosure.

FIG. 32 is a block diagram illustrating a BASE STATION according to an embodiment of the disclosure.

Referring to FIG. 32, the device 3200 may include a transceiver 3210, a memory 3220 and a processor 3230, However, all of the illustrated components are not essential. The device 3200 may be implemented by more or less components than those illustrated in FIG. 32. In addition, the transceiver 3210, the memory 3220 and the processor 3230 may be implemented as a single chip according to another embodiment. Furthermore, the transceiver 3210, the memory 3220, and/or the processor 3230 may include at least one transceiver, at least one memory and/or at least one processor, respectively.

The aforementioned components will now be described in detail.

The transceiver 3210 may include a RF transmitter for up-converting and amplifying a transmitted signal, and a RF receiver for down-converting a freqbase stationncy of a received signal. However, according to another embodiment of the disclosure, the transceiver 3210 may be implemented by more or less components than those illustrated in components.

The transceiver 3210 may be connected to the processor 3210 and transmit and/or receive a signal. The signal may include control information and data. In addition, the transceiver 3210 may receive the signal through a wireless channel and output the signal to the processor 3230. The transceiver 3210 may transmit a signal output from the processor 3230 through the wireless channel.

The memory 3220 may store the control information or the data included in a signal obtained by the device 3200. The memory 3220 may be connected to the processor 3210 and store at least one instruction or a protocol or a parameter for the proposed function, process, and/or method. The memory 3220 may include read-only memory (ROM) and/or random access memory (RAM) and/or hard disk and/or CD-ROM and/or DVD and/or other storage devices.

The processor 3230 may control the proposed function, process, and/or method. Operation of the device 3200 may be implemented by the processor 3230.

In an embodiment of the disclosure, the processor 3230 may execute a program stored in the memory 3220 to receive a first message from the UE, the first message including a MAC PDU that includes a CCCH SDU or a C-RNTI and a random access preamble, transmit a PDCCH for a second message corresponding to the first message within a configured time window, and transmit the second message on a PDCCH for the first and second messages to the UE within a configured time window.

Furthermore, the transceiver 3210, the memory 3220, and/or the processor 3230 may include at least one transceiver, at least one memory and/or at least one processor, respectively.

In an embodiment of the disclosure, the processor 3230 may execute a program stored in the memory 3220 to receive a first message from the UE, the first message including a MAC PDU that includes a CCCH SDU or a C-RNTI and a random access preamble, transmit a PDCCH for a second message corresponding to the first message to the UE within a configured time window, and transmit the second message on a PDCCH for the first and second messages to the UE within a configured time window.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for performing two-step random access in a user equipment (UE), the method comprising:
   transmitting a message A (MsgA) to a base station, the MsgA including a random access preamble;
   monitoring a physical downlink control channel (PDCCH) for a message B (MsgB) from the base station within a configured time window for the two-step random access, the MsgB corresponding to the MsgA; and
   transmitting a Msg3 of a four-step contention-based random access (CBRA) procedure in case that:
      the MsgB includes a medium access control (MAC) sub protocol data unit (subPDU) including a MAC subheader and a payload for fallback to the four-step CBRA procedure, and
      the MAC subheader includes a random access preamble identifier (RAPID) that matches the random access preamble included in the MsgA.

2. The method of claim 1, further comprising:
   identifying the two-step random access being successful, based on a result of the monitoring,
   wherein the identifying of the two-step random access being successful based on the result of the monitoring comprises:
      determining that the two-step random access is successful in case that:
         a PDCCH addressed to a MsgB-RNTI is received from the base station,
         at least one transport block (TB) scheduled by the PDCCH addressed to the MsgB-RNTI is successfully decoded,
         a common control channel (CCCH) service data unit (SDU) is included in the MsgA, and
         the MAC subPDU of the MsgB includes a contention resolution identity (ID) that matches first X bits of the CCCH SDU.

3. The method of claim 2, wherein the X comprises 48.

4. The method of claim 2, wherein the MAC subPDU of the MsgB comprises a Timing Advance (TA) Command, a C-RNTI and the contention resolution ID.

5. The method of claim 2, wherein the identifying of the two-step random access being successful based on the result of the monitoring comprises:
   determining that the two-step random access is successful in case that:
      a cell radio network temporary identifier (C-RNTI) in a MAC control element (CE) is included in the Msg A, and
      a PDCCH addressed to the C-RNTI is received from the base station.

6. The method of claim 2, wherein the identifying of the two-step random access being successful based on the result of the monitoring comprises:
   determining that the two-step random access is successful in case that:
      a cell radio network temporary identifier (C-RNTI) in a MAC control element (CE) is included in the MsgA,
      a PDCCH addressed to the C-RNTI is received from the base station, and
      the PDCCH addressed to the C-RNTI includes an uplink (UL) grant for a new transmission.

7. The method of claim 1, wherein the payload of the MAC subPDU of the MsgB includes a TA Command, an UL grant and a temporary identifier (TC-RNTI).

8. A method for performing two-step random access in a base station, the method comprising:
   receiving a message A (MsgA) from user equipment (UE), the MsgA including a random access preamble;
   transmitting a message B (MsgB) corresponding to the MsgA to the UE, on a physical downlink control channel (PDCCH) for the MsgB; and
   receiving a Msg 3 of a four-step contention-based random access (CBRA) procedure from the UE in case that:
      the MsgB includes a medium access control (MAC) sub protocol data unit (subPDU) including a MAC subheader and a payload for fallback to the four-step CBRA procedure, and
      the MAC subheader including a random access preamble identifier (RAPID) that matches the random access preamble included in the MsgA,
   wherein the PDCCH for the MsgB is monitored within a configured time window for the two-step random access.

9. The method of claim 8,
   wherein the PDCCH for the MsgB is addressed to a MsgB-RNTI, in case that a common control channel (CCCH) service data unit (SDU) is included in the MsgA, and
   wherein the MAC subPDU of the MsgB includes a contention resolution identity (ID) that matches first X bits of the CCCH SDU included in the MsgA.

10. The method of claim 9, wherein the MAC subPDU of the MsgB comprises a Timing Advance (TA) Command, a C-RNTI and the contention resolution ID.

11. The method of claim 8, wherein in case that a cell radio network temporary identifier (C-RNTI) in a MAC control element (CE) is included in the MsgA, the PDCCH for the MsgB is addressed to the C-RNTI.

12. The method of claim 11, wherein in case that a cell radio network temporary identifier (C-RNTI) in a MAC control element (CE) is included in the MsgA, the PDCCH for the MsgB is addressed to the C-RNTI and the PDCCH for the MsgB includes uplink (UL) grant for a new transmission.

13. The method of claim 8, wherein the payload of the MAC subPDU of the MsgB includes a TA Command, an UL grant and a temporary identifier (TC-RNTI).

14. A user equipment (UE) for performing two-step random access, the UE comprising:
   a transceiver;
   at least one memory storing a program to perform the two-step random access; and
   at least one processor, by executing the program, configured to:
      transmit a message A (MsgA) to a base station, the MsgA including a random access preamble,
      monitor a physical downlink control channel (PDCCH) for a message B (MsgB) from the base station within a configured time window for the two-step random access, the MsgB corresponding to the MsgA,
      identify the two-step random access being successful based on a result of the monitoring, and
      transmit a Msg 3 of a four-step contention-based random access (CBRA) procedure in case that:
         the MsgB includes a medium access control (MAC) sub protocol data unit (subPDU) including a MAC subheader and a payload for fallback to the four-step CBRA procedure, and
         the MAC subheader includes a random access preamble identifier (RAPID) that matches the random access preamble included in the MsgA.

15. A base station for performing two-step random access, the base station comprising:
   a transceiver;
   at least one memory storing a program to perform the two-step random access; and
   at least one processor, by executing the program, configured to:
      receive a message A (MsgA) from user equipment (UE), the MsgA including a random access preamble,
      transmit a message B (MsgB) corresponding to the MsgA to the UE, on a physical downlink control channel (PDCCH) for the Msg B, and
      receive a Msg 3 of a four-step contention-based random access (CBRA) procedure from the UE in case that:
         the MsgB includes a medium access control (MAC) sub protocol data unit (subPDU) including a MAC subheader and a payload for fallback to the four-step CBRA procedure, and
         the MAC subheader including a random access preamble identifier (RAPID) that matches the random access preamble included in the MsgA,
   wherein the PDCCH for the MsgB is monitored within a configured time window for the two-step random access.

* * * * *